(12) United States Patent (10) Patent No.: US 9,143,236 B1
Bartur et al. (45) Date of Patent: Sep. 22, 2015

(54) FIBER FAULT DETECTION WITHIN DATA TRANSCEIVER HAVING MICRO OTDR (µOTDR) FOR FIBER OPTIC NETWORK

(75) Inventors: Meir Bartur, Los Angeles, CA (US); Jim Stephenson, Thousand Oaks, CA (US); Farzad Ghadooshahy, Los Angeles, CA (US)

(73) Assignee: Optical Zonu Corporation, Van Nuys, CA (US)

( * ) Notice: Subject to any disclaimer, the term of this patent is extended or adjusted under 35 U.S.C. 154(b) by 352 days.

(21) Appl. No.: 13/569,099

(22) Filed: Aug. 7, 2012

Related U.S. Application Data

(60) Provisional application No. 61/521,311, filed on Aug. 8, 2011.

(51) Int. Cl.
| | |
|---|---|
| *H04B 10/08* | (2006.01) |
| *H04B 17/00* | (2015.01) |
| *H04B 10/50* | (2013.01) |
| *H04B 10/40* | (2013.01) |

(52) U.S. Cl.
CPC .............. *H04B 10/504* (2013.01); *H04B 10/40* (2013.01)

(58) Field of Classification Search
CPC ........ H04B 10/00; H04B 10/04; H04B 10/06; H04B 10/08
USPC .................... 398/17, 16, 21, 22, 10
See application file for complete search history.

(56) References Cited

U.S. PATENT DOCUMENTS

| | | | |
|---|---|---|---|
| 4,449,247 A | | 5/1984 | Waschka, Jr. |
| 5,586,251 A | | 12/1996 | Coleman et al. |
| 5,619,058 A | * | 4/1997 | Kim ............... 257/431 |
| 6,285,475 B1 | * | 9/2001 | Fee .................. 398/10 |
| 6,385,561 B1 | * | 5/2002 | Soraghan et al. ............ 702/185 |
| 6,714,021 B2 | * | 3/2004 | Williams ....................... 324/533 |
| 7,139,668 B2 | | 11/2006 | Bechhoefer |
| 7,218,388 B1 | | 5/2007 | Keeler et al. |
| 7,239,680 B2 | | 7/2007 | Bui |
| 7,558,212 B2 | | 7/2009 | Olinski |
| 7,852,213 B2 | * | 12/2010 | Browning et al. ............ 340/555 |
| 2002/0027689 A1 | * | 3/2002 | Bartur et al. .................. 359/152 |
| 2003/0113118 A1 | * | 6/2003 | Bartur ........................... 398/139 |
| 2005/0201761 A1 | * | 9/2005 | Bartur et al. .................. 398/197 |
| 2006/0127086 A1 | * | 6/2006 | Frankel ........................... 398/19 |
| 2007/0140688 A1 | * | 6/2007 | Patel et al. ......................... 398/5 |
| 2008/0175587 A1 | * | 7/2008 | Jensen .............................. 398/2 |

(Continued)

OTHER PUBLICATIONS

Frank A. Maier and Harald Seeger, "Automation of Optical Time-Domain Reflectometry Measurements", Hewlett-Packard Journal, Feb. 1995, 57-62.

*Primary Examiner* — David Payne
*Assistant Examiner* — Pranesh Barua
(74) *Attorney, Agent, or Firm* — Thomas I. Rozsa

(57) ABSTRACT

The present invention is an apparatus and method that identifies and localizes fiber breaks or faults automatically, utilizing a fiber optic data transceiver that has µOTDR functionality. The transceiver of the present invention is a single wavelength bi-directional transceiver that during normal operation sends and receives optical data streams in the same wavelength window using any protocol and reports the distance to the fault or multiple faults nearly instantaneously when the transfer of data is disrupted, without the need to have fiber lines dedicated for this purpose or physically connect and reconnect each fiber line to check for faults and eliminates the need to map out the distance to the remote transceiver.

31 Claims, 10 Drawing Sheets

(56) References Cited

U.S. PATENT DOCUMENTS

| | | | |
|---|---|---|---|
| 2009/0028553 A1* | 1/2009 | Oron | 398/25 |
| 2009/0129773 A1* | 5/2009 | Oron | 398/10 |
| 2009/0196598 A1* | 8/2009 | Duan et al. | 398/5 |
| 2009/0324214 A1* | 12/2009 | Li et al. | 398/1 |
| 2010/0074616 A1* | 3/2010 | Kewitsch | 398/38 |
| 2010/0119223 A1* | 5/2010 | Ferrari et al. | 398/4 |
| 2012/0027415 A1* | 2/2012 | Chan et al. | 398/115 |

* cited by examiner

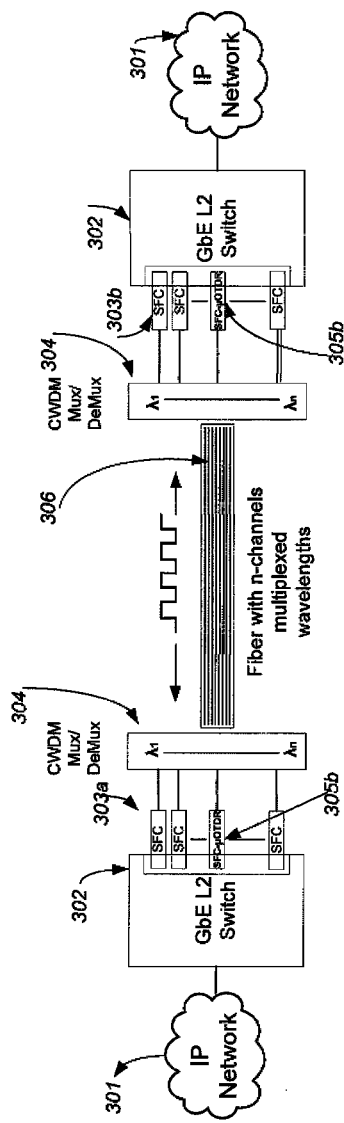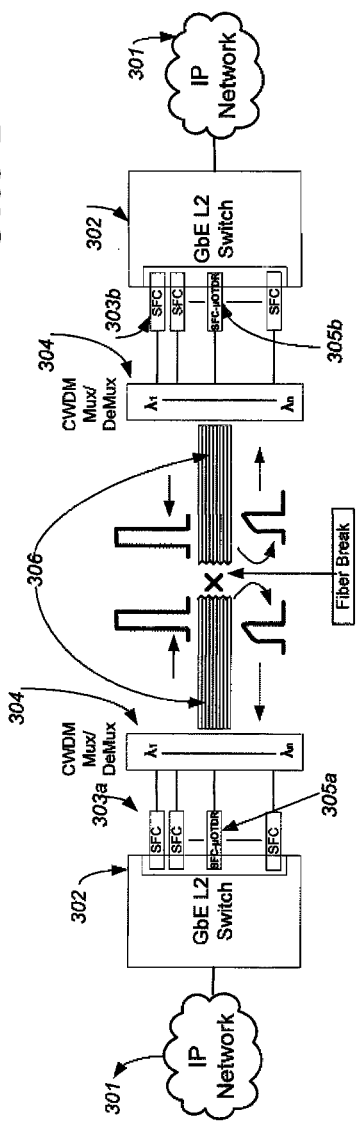

FIBER FAULT DETECTION WITHIN DATA TRANSCEIVER HAVING MICRO OTDR (µOTDR) FOR FIBER OPTIC NETWORK

This patent application claims priority to Provisional Application Ser. No. 61/521,311 filed on Aug. 8, 2011.

BACKGROUND OF THE INVENTION

1. Field of the Invention

The present invention relates to the detection of faults within a fiber optic network and the determination of the location of the detected fault and more specifically to the method and apparatus to determine the presence of, and location of, a fiber network fault, within a single optical fiber strand, utilizing, in particular, a transceiver that operates as both a digital bi-directional data transport on the same fiber, and a micro optical time-domain reflectometer (µOTDR).

2. Description of the Prior Art

In general terms, the detection of communication line faults has been a concern in the art for a long time. The advent of the communication age was accompanied by the proliferation of the necessary wires and cables to support that communication. As the communication networks grew larger, so too did the lengths of wires, cables, and now fiber optic lines, which now comprise networks thousands of kilometers in length. These wires, cables and optical fibers may be damaged for a number of reasons and need repair. Pinpointing the location of a fault is valuable information, regardless of whether the network is just a few meters or a few thousand meters in length.

The following are some examples of prior art fault detection devices:

U.S. Pat. No. 4,449,247 issued to Waschka (hereafter the "Waschka Patent") depicts a system that transports additional data regarding the local status of each terminal, between the different terminals of a communication system. Unlike the present invention, the Waschka Patent does not check the status of the optical fiber or the location of a fault in the fiber, but merely has each station send out its own status to its neighboring terminal, receive status from a neighboring terminal and create separate alarms based on the various status notices. Additionally, the Waschka Patent recognizes only that it lost data and cannot determine if there is an electronic failure, a fiber failure, or a failure with the detector. Further, the Waschka Patent does not measure the distance to any fiber that is broken or determine if a fault is a fiber failure or an electronic failure. The Waschka Patent is merely a generic structure that sends and reads status reports to and from the various terminals without doing any type of analysis.

U.S. Pat. No. 5,586,251 issued to James A. Coleman et al. and assigned to the United States of America as represented by the Secretary of the Army on Dec. 17, 1996 for "Continuous On-Local Area Network Monitor" (hereafter the "Coleman Patent"), discloses a high level monitoring system of interconnected instruments having a plurality of connections to transmit and receive data regarding the status of the various segments of the system, including a preamble to notify the system that the following is not data. The Coleman Patent transmits information, doesn't look at the reflection of light and requires a plurality of transceivers and is incapable of detection by the transmission and receiving of light and using same to determine the location of a fault within the optic fiber itself.

U.S. Pat. No. 6,385,561 issued to John James Soraghan (hereafter the Soraghan Patent") discloses detecting faults in electrical cables by coupling signals and comparing them and having separate input and output leads. The Soraghan Patent applies this same detection technique of coupling and comparing signals to fiber optic cables and storing sample signals. Soraghan is incapable of detecting a fault utilizing only one fiber and without any sampling, storage or comparisons.

U.S. Pat. No. 6,714,021 issued to Emrys J. Williams (hereafter the "Williams Patent") discloses detecting faults within an electrical system by using electrical impedance and further requires a center plane, a back plane and a second back plane. The Williams Patent cannot be used for an optical circuit.

U.S. Pat. No. 7,139,668 issued to Eric Robert Bechhoefer (hereafter the "Bechhoefer Patent") discloses the utilization of storing digitized electrical reflections and scoring them to determine the presence of an event. The Bechhoefer Patent is designed for a cable system, not a fiber optic system, and utilizes different components to transmit and receive than it does to determine an event in the system.

U.S. Pat. No. 7,218,388 issued to Gordon A. Keeler et al. and assigned to Sandia Corporation on May 15, 2007 for "VSCEL Fault Location Apparatus And Method" (hereafter the "Keeler Patent") discloses the use of the same light source that transmits the light to also detect a reflection. Additionally, the Keeler Patent discloses the addition of an electronic circuit that changes the bias, and hence performance and characteristics, of the device, in order to perform a fault detection. Additionally, the transmitter in the Keeler Patent cannot, in normal operation, transmit and receive data, it can only transmit. The Keeler transmitter can receive data after a first and a second bias has been applied, after which it cannot transmit until the biases have been removed. The Keeler Patent does not have a data receiver in its system.

U.S. Pat. No. 7,239,680 issued to Sang T. Bui (hereafter the "Bui Patent") discloses a method to diagnose an electrical system utilizing adaptive coefficients as filters which is used to determine the status of the cables as either open or short. An optic fiber doesn't have shorts, thus the Bui Patent cannot be used for fiber optic systems.

U.S. Pat. No. 7,558,212 issued to Jerome Edwin Olinski (hereafter the "Olinski Patent"), discloses a method for performing diagnostics by comparing the signal to stored data. Additionally, the Olinski Patent has mapped out and stored the physical locations of points along its pathway and it is to one of these points that the Olinski Patent directs a user as the location of the fault. In other words, the Olinski Patent requires prior knowledge of everything on its line, to which it then matches the response signal with the cable information and thus gives, as the location of the fault, the location of the nearest physical object on its line.

An Article dated February 1995 from the Hewlett-Packard Journal by Frank A. Maier and Harald Seeger entitled "Automation of Optical Time-Domain Reflectometry Measurements" (hereafter the "Hewlett Packard Article") discloses the use of an OTDR which must be physically attached to each cable one at a time for testing for faults, whether by switching the lines internally or physically reconnecting the OTDR to the fiber. The Hewlett Packard Article does not teach that the same unit that is used to detect the fault is also used to transmit data.

SUMMARY OF THE INVENTION

Fiber Optic networks carry high priority data for multiple services. Any disruption of the network due to fiber break must be identified and repaired as quickly as possible. Current methodology to identify the location of a fiber break has multiple steps:

Recognizing that the link is down, meaning that there is no data transfer and/or high Bit Error Rate (BER) exists;

Identifying the particular fiber, or fiber pair, that constitutes the link that is down;

Sending a technician with specialized equipment, including an Optical Time Domain Reflectometer (OTDR) Tester to the patch panel where the fibers identified above are down or terminated;

Measuring the distance to the fault;

Consulting a detailed network map and/or database that translates the distance from the point of testing to physical location; and Reporting the distance to a technical team that is dispatched to the location of the fault.

The present invention resolves all the problems of the prior art. The present invention is an apparatus and method that identifies and localizes fiber breaks (or faults) automatically. The present invention can transfer data during normal operation and report the distance to the fault or multiple faults nearly instantaneously when the transfer of data is disrupted. Unlike the prior art, there is no need in the present invention to have fiber lines dedicated for this purpose or physically connect and reconnect each fiber line to check for faults. The present invention eliminates the need to map out the distance to the remote transceiver—it is measured automatically during installation, or to transmit status messages.

The principal idea behind the current invention is to use a single wavelength bi-directional transceiver that during normal operation sends and receives optical data streams in the same wavelength window using any protocol (e.g. Ethernet per 802.3, SONET, or any other). When normal data transfer fails, the transceiver initiates a special mode in which its transmitter is sending high energy light pulses and the received signal, an echo from a fault location, is timed in reference to the transmitted signal. Since fiber break generates reflection of light at the break point, the time the reflected signal is received is the time it takes light to propagate from the laser to the fault (which is the location of the reflection) and back. Since the speed of light in the fiber is well known, the distance to the fault can be measured. Multiple faults can be identified if the receiver circuitry is capable to discern the timing of multiple reflections.

The inventors hereto have invented a new type of optical fiber fault detector. The present invention automates the first four steps above. This is a unique feature and ability in the art. Additionally, the present invention provides for automatic integration with mapping database(s) to locate physical location of the faults within seconds of the break/fault event. With such integration, all six of the above steps are automatically performed. The ability to have all six steps automatically performed is unheard of and is unique and innovative in the field and will provide a significant advantage to the network system which utilizes the present invention.

It is therefore a principal object of the present invention to describe the implementation of µOTDR, capable to detect and report fiber fault within a second, within a single fiber single wavelength data transceiver.

It is another object of the present invention to describe a single fiber single wavelength transceiver that is immune to reflections.

It is still another object of the present invention to provide OTDR functionality and capability within the transceivers of the optical fiber network itself.

It is still another object of the present invention to provide for fiber fault detection without requiring the dedication of fiber lines for fault detection purposes only.

It is still another object of the present invention to provide for an automated detection of faults by and within the same unit that is used to receive and transmit data.

It is still another object of the present invention to provide for an optical fiber fault detector that measures the exact link distance during installation without having to previously map out the entire fiber optic network.

It is still another object of the present invention to provide for an optical fiber fault detector that integrates with mapping data bases that depicts the fiber plant routes and enables a graphic presentation on the maps of the location of the fault.

It is still another object of the present invention to provide for an optical fiber fault detector that is used to determine a break or a cut in other systems, such as utility cables, power cables, network cables, and also to determine a break or cut other physical structures, such as fences, conduits, and pipelines.

It is still another object of the present invention to provide for a fiber fault detector for fiber optic systems having a transceiver that does not change its performance, characteristics and qualities in order to perform fault detection.

It is still another object of the present invention to provide for a fiber fault detector that detects a fault utilizing only one fiber and without any sampling, storage or comparisons.

It is still another object of the present invention to provide for a fiber fault detector that determines the location of a fault within an optic fiber by using the transmission and receiving of light within the optic fiber.

In accordance with the present invention, a fiber fault detector within a data transceiver having micro OTDR, µOTDR, capabilities and functions systems, methods, and apparatus are provided that substantially eliminate or reduce the disadvantages of traditional fiber optic fault detection systems and apparatus.

Still further objects and advantages will become apparent from a consideration of the ensuing description and accompanying drawings.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings, which are for the purpose of illustration only and not limitation, and in which:

FIG. 3a is a schematic representation of the present invention of a single fiber optic link between two sites, incorporating CWDM MUX, under normal operation;

FIG. 3b is a schematic representation of the present invention of a single fiber optic link between two sites, incorporating CWDM MUX, after a fiber is broken;

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
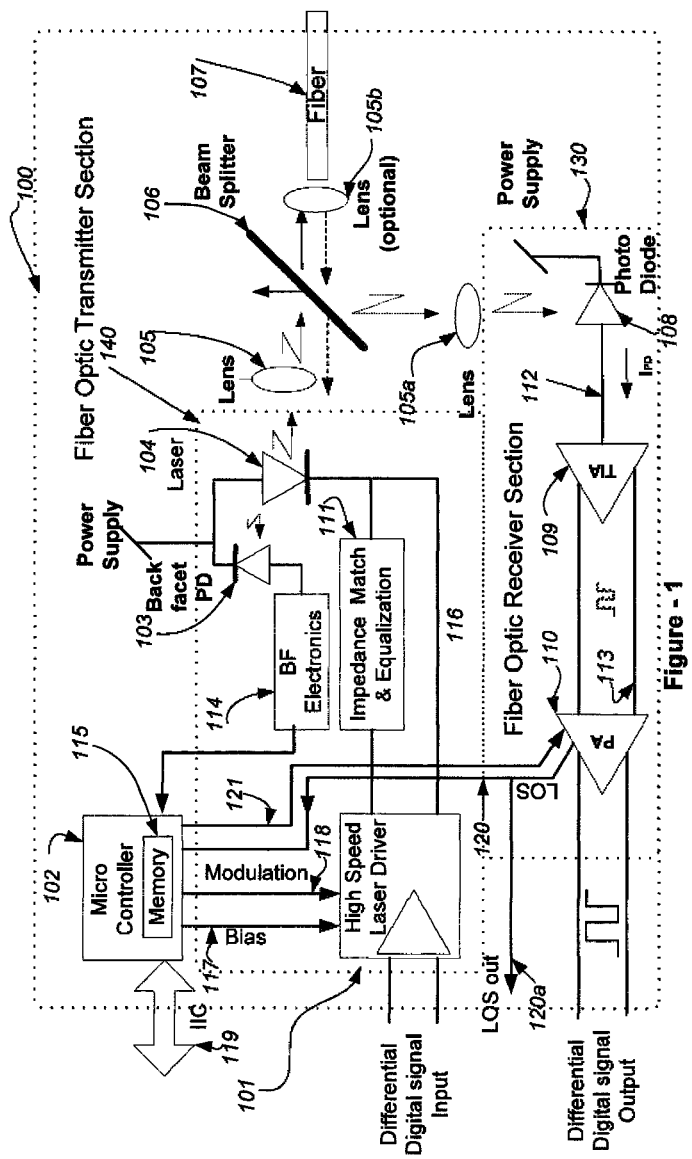
FIG. 1 is a block diagram of a prior art bi-directional transceiver.

Referring now to FIG. 1, there is shown a block diagram of a BI-DIRECTIONAL TRANSCEIVER 100. The TRANSCEIVER 100 is generally divided in two, having a FIBER OPTIC RECEIVER SECTION 130 and a FIBER OPTIC TRANSMITTER SECTION 140.

In general, a standard, single fiber, single wavelength fiber optic bi-directional TRANSCEIVER 100 has the following main functional elements:

A Digital Laser Diode (LASER) 104 that transmits optical power pulses in response to input current. The LASER 104 is a device that efficiently converts electrical power to optical power via a process called stimulated emission. LASERS 104 work as a result of resonant effects such that the output of a laser is a coherent electromagnetic field. In a coherent beam of electromagnetic energy, all the waves have the same frequency and phase. Using supporting electronics the LASER'S 104 optical power can be modulated at high speed enabling transmissions of optical pulses at high rate. An example for a Laser is MITSUBISHI LASER DIODE ML9XX43 family. The laser package usually include a BACK FACET (BF) detector 103 that is a photodetector that detects the light from the back side of the LASER 104 which is proportional to the LASER'S 104 output power. The measurement that is proportional to the output power from the laser enables implementation of automatic power control circuitry to maintain the stability of the laser over temperature. The signal from the BF 103 is processed in the BACK FACET ELECTRONICS 114 and provided to the MICROCONTROLLER 102.

LASER DRIVER electronics 101 that controls the LASER 104 and translates the input data stream to current pulses for laser modulation. The primary function of LASER DRIVER 101 is to provide appropriate currents for bias and MODULATION 118 of the LASER DIODE 104. The BIAS 117 is a control line that controls the LASER DRIVER 101 to provide constant current that pushes the LASER DIODE 104 via line 116 to operate above its threshold value and into the linear region. MODULATION CONTROL LINE 118 is a control line from the MICROCONTROLLER 102 to the LASER DRIVER 101 that sets the amplitude of the alternating current of the modulation output that is controlling the light output power from the LD 104 based on the input voltage waveform.

To ensure proper performance over temperature the BIAS 117 current tracks the changes in the LASER 104 threshold current and the MODULATION 118 current amplitude tracks the changes in the LASER 104 slope efficiency. The LASER DRIVER 101 also supplies the DC bias current via the BIAS SUPPLY LINE 116 to the LASER 104. The BIAS SUPPLY 116 is designed to decouple the DC current from the modulated current that generates the data of the optical signal. An example of a laser driver is SY88212L from Micrel a 3.3V 2.5GBPS with Integrated Bias and APC.

IMPEDANCE MATCH AND EQUALIZATION 111. It is important to maintain constant impedance at the cathode of the LASER DIODE 104 such that the load on the high-speed output circuit versus frequency will remain stable, otherwise an unstable load on the output circuit will cause reflections, ringing, and other art effects, that will degrade the quality of the optical waveform. Proper characterization of the LASER 104 and LASER DRIVER 101 output impedance along with appropriate passive circuits minimize the effect of the LASER 104 cathode impedance variation.

PHOTO DETECTOR (PD) 108 that receives the light and translates it to electric current. PHOTO DETECTOR 108, typically a PIN photodiode, functions exactly the opposite of a LASER DIODE 104 where it absorbs photons and converts them into electrical current. PHOTODIODE DETECTORS 108 are current sources, with the current produced being proportional to the light intensity illuminating them. The PHOTO DIODE 108 must be able to detect small digital signals over the top of any electromagnetic noise signals that are inherent in PHOTO DIODE 108 itself and additionally in the light source and supporting electronics. It is enabling the detection of incident photons, and responds to the fastest changes in that incoming signal at a high rate.

TRANSIMPEDANCE AMPLIFIER (TIA) 109 that amplifies the current generated by the PD 108. TRANSIMPEDANCE AMPLIFIERS 109 translate the output from a very high impedance current source such as PHOTO DIODES 108 current to a low impedance amplifier output in the voltage form.

An example for a Fiber Optic Receiver Section 130 assembly that contains the PD 108 and TIA 109 is inside AODR-P33N0-LM1-XI from Advanced Optronice Devices, al 0.25GBPS PIN-TIA assembly. The invention is applicable to any data rate and any communication protocol. The CONNECTION 112 between the PD 108 and the TIA 112 is usually all packaged together with the PD 108. The PD assembly includes an output that is proportional to the total incoming optical input. That output is delivered to the MICROCONTROLLER 102. This connection and the scaling electronics are not shown in the figures. The input optical power is stored in the MICROCONTROLLER 102 and/or in its MEMORY 115 and is available for reading by the host equipment through the IIC BUS 119. The IIC BUS 119 is an example of the means to communicate with the HOST EQUIPMENT 302.

The output of the TIA 112 is connected to the next stage via LINE 113 that can be either AC or DC coupled. This next stage is the QUANTIZER ELECTRONICS 110, for example MAX3747 from Maxim with signal detect and squelch/enable function built in, that translates the received signal by making decisions regarding the existence of a valid signal, i.e. if there is not a valid data signal stream, then LOSS OF SIGNAL (LOS) 120 is high; if there is a valid data stream, then LOS 120 is low. The QUANTIZER ELECTRONICS 110 also makes decisions regarding the determination of 1's and 0's for the output data stream. The LOS 120 signal can be provided as an output of the transceiver LOS out 120a that is a separate I/O (input/output) pin, and/or provided to the MICRO CONTROLLER 102 via control line LOS 120 to be available for monitoring through the IIC BUS 119. Known alternatively as POST AMPLIFIER (PA) 110, the QUANTIZER may simply amplify the weak signals and convert it in the digital stream. Some PA 110 have an inhibit input that forces no output data, regardless of the input from the TIA 109. A CONTROL LINE 121 from the MICROCONTROLLER 102 can shut down the PA 110 output. Sometimes the LOS 120, 120a output is connected directly to the inhibit input of CONTROL LINE 121 to allow effective squelching ensuring that when the signal is poor, meaning that the LOS 120, 120a are high, the output data is inhibited thus eliminating the noise from the data output.

MICROCONTROLLER 102 monitors all the functions of the TRANSCEIVER 100, can function as the automatic power control, and provide communication means through a BUS 119 (e.g. IIC bus) to the host equipment. INTERNAL MEMORY 115 can be used to store values and events for external reporting through the BUS 119. The MICROCONTROLLER can supply the control signals to the LASER DRIVER 101 both for modulation control via MODULATION CONTROL LINE 118 and for bias control via BIAS CONTROL LINE 117.

The communication media, for both transmitted and received optical signals, is the FIBER 107. An optional LENS 105b close to the fiber tip focuses the light in both directions. OPTICAL BEAM SPLITTER 106 is the means that directs the portion of the received signal to the PD 108 and enables coupling the LD 104 optical output into the fiber through a LENS 105. The implementation used here BY WAY OF AN EXAMPLE is not unique. It is possible to connect the power splitter outside the transceiver body and have fiber connections to the active parts— one to the Laser 104 and one to the Photo Detector 108. A simple, fiber based, optical splitter can be used in-lieu of the Beam Splitter 106. ALTERNATIVEly an Optical Circulator (like SUN-OC-3-xx-P-X-X-X from GLsun Science and Tech Co.) can be used as a means to combine or separate the optical traffic in both directions into a single fiber. These are two of the several means to transport the data stream bi-directionally in a single fiber. In the application we are using the compact integrated solution as an example—without limitation. A BEAM SPLITTER 106 is an optical device, positioned at about 45 degrees to the beam path, which can partially reflect and partially transmit an incident light beam such as laser beam, or receiving light beam from the external world through the FIBER CABLE 107 into two optical light beams of similar or different optical power. It can reflect 60% of the light and transmit 40% (assuming negligible absorption losses), split it even 50/50 or any other ratio. To optimize operation, a 50/50 splitter is used in the present invention. The light coming from the fiber 107, i.e. the signal transmitted from the other end of the link, is reflected by the BEAM SPLITTER 106 and focused by the LENS 105a into a PHOTODETECTOR (PD) 108.

At least one focusing LENS 105 for each of the optical beams that couples optical light to and from the FIBER 107 in/out of an active device LD 104 or PD 108.

It is an industry practice to package the LASER 104 with the BF DETECTOR 103, the BEAM SPLITTER 106 and the PD 108 in a single optical device called BOSA. An example to advanced BOSA is in U.S. Pat. No. 6,652,158. Any person familiar with the art of bi-directional optical packaging for fiber optic communication knows how to optimize the design for improved coupling and reduced crosstalk. Crosstalk is the stray light from the LASER 104 reflected by the BEAM SPLITTER 106 inside the optical assembly and eventually trough multiple reflection finds its way into the DETECTOR 108.

Figure 2A:
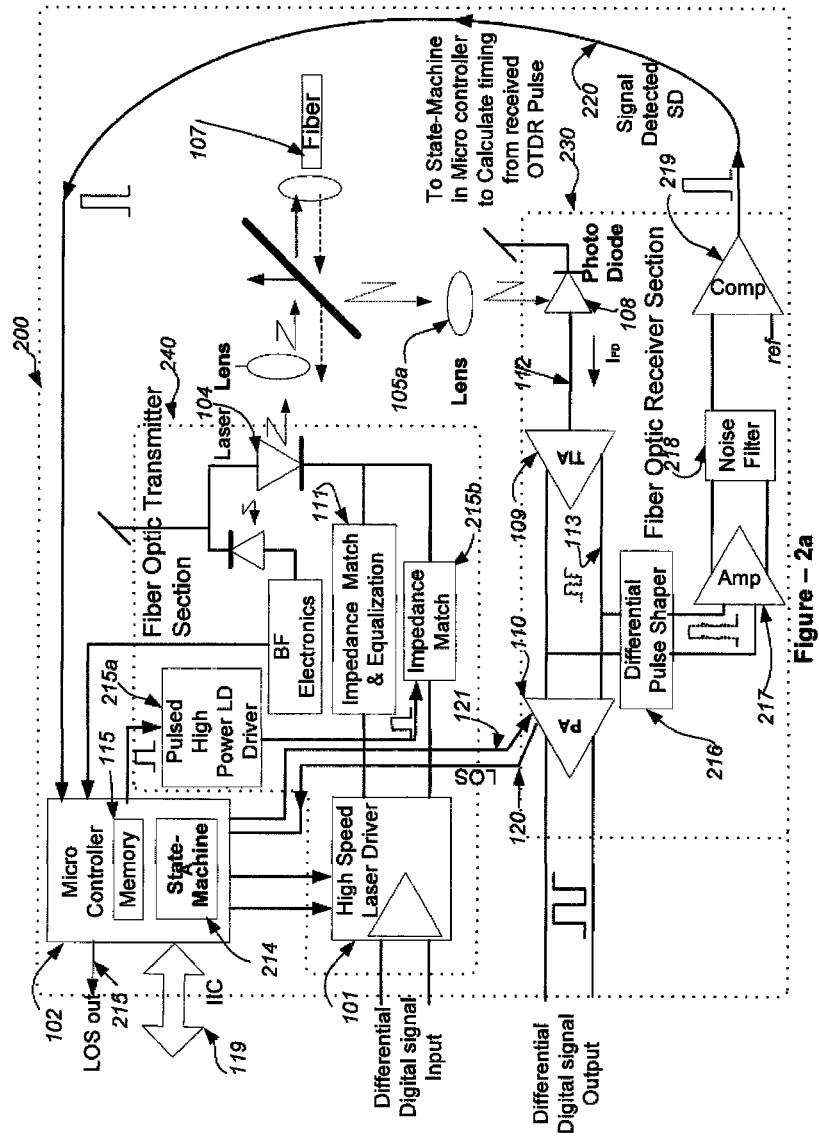
FIG. 2a is a block diagram of a bi-directional transceiver further illustrating an integrated micro optical time-domain reflectometer (µOTDR) of the present invention.
Figure 4A:
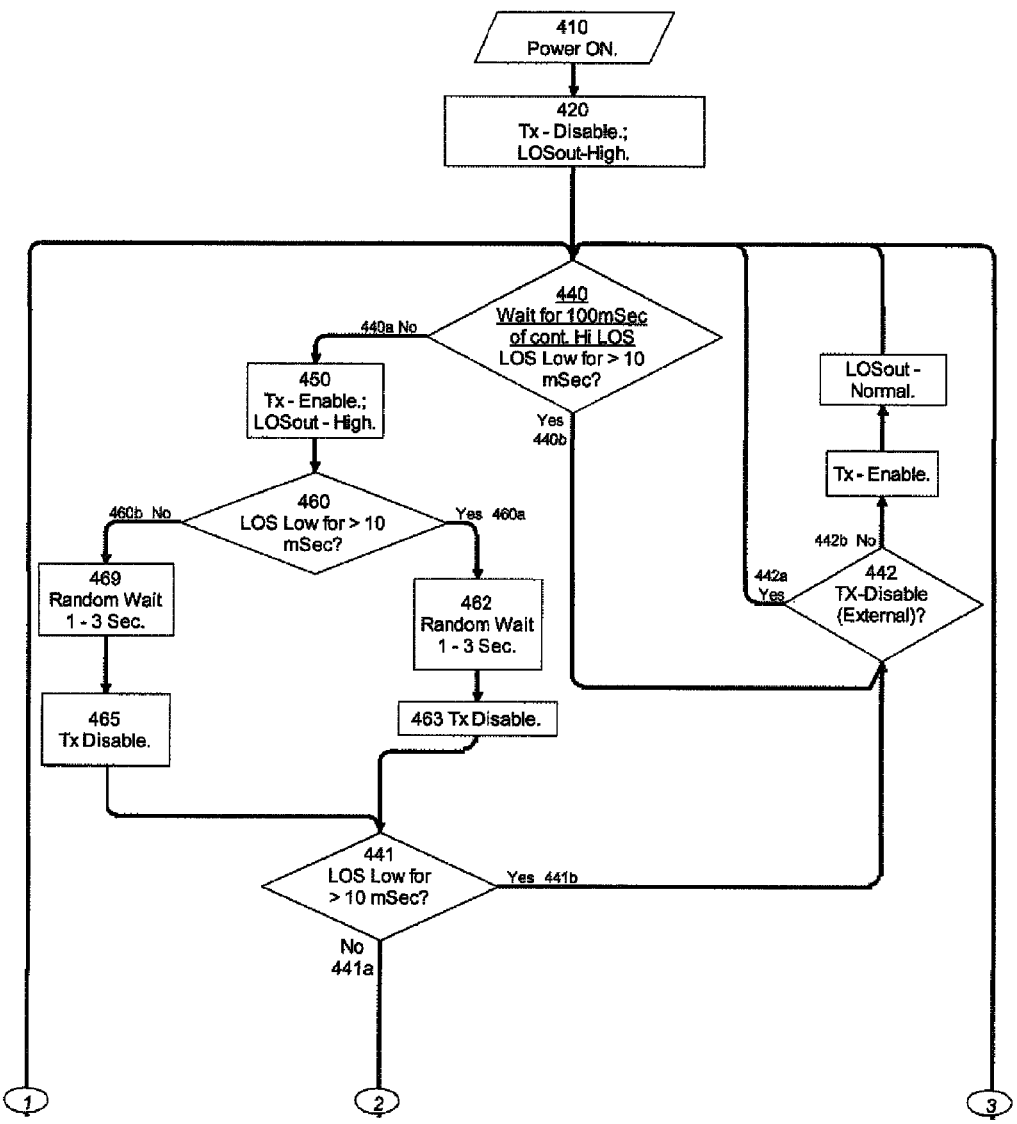
FIG. 4a is the first part of an operation flow diagram of the µOTDR of the present invention.
Figure 4B:
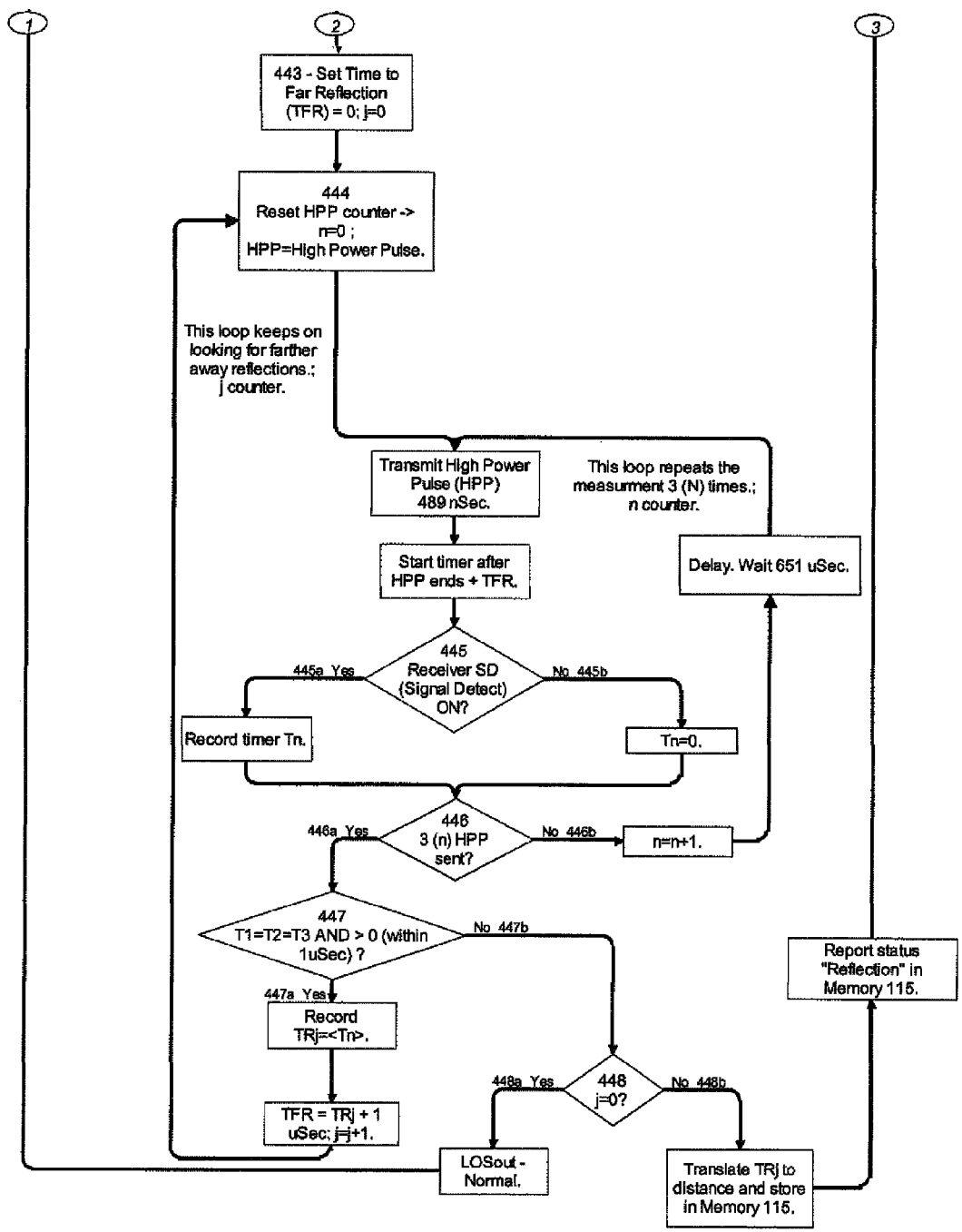
FIG. 4b is the second part of an operation flow diagram of the µOTDR of the present invention.

Referring now to FIG. 2a, there is shown BI-DIRECTIONAL TRANSCEIVER 100 with the µOTDR 200 of the present invention. The fiber optic µOTDR TRANSCEIVER 200 of the present invention, as depicted in FIG. 2a, has the following additional and novel functional elements:

The FIBER OPTIC TRANSMITTER SECTION 240 is a modified version of the prior art 140. The additional elements and modifications are:

A STATE MACHINE FIRMWARE 214 implemented in the processor logic 214 that recognizes when the data link is down and controls the µOTDR 200 operation. The STATE MACHINE 214 is a means to transmit a high power pulse. The STATE MACHINE'S 214 function is to command the high power PULSE ELECTRONICS CIRCUIT to 215a to pulse the LASER 104 at high current levels, producing a large optical signal with a fixed duration. The STATE MACHINE 214 FIRMWARE LOGIC 400 as depicted in FIGS. 4a and 4b, in detail, recognizes if the data stream is interrupted, using the LOS 120 signal and/or the monitored value of the input optical power delivered by the PD 108 to the MICROCONTROLLER 102, and initiates the µOTDR 200 pulse.

A HIGH POWER PULSE DRIVER circuitry 215a that is capable to drive a high current narrow pulse into the LD 104 to produce optical power in accordance to the amount of current supplied to the LASER 104. To pulse the LASER 104 at very high current, the electronic circuit is designed to provide low electrical insertion losses but at the same time capable of delivering high current to the LASER 104. The DRIVER 215a can be a transistor like NE97833 a PNP transistor from CEL. The signal pass chosen in the present invention is via the bias control of the LASER 104 and special IMPEDANCE MATCH 215b is used to decouple the PULSE DRIVER 215a from the modulating signal path used for normal operation. The quality of the modulating current as measured by the open eye diagram of the OPTICAL TRANSMITTER 140 should not be affected by the existence of the PULSE DRIVER 215a during normal operation. The total IMPEDANCE 215b seen from the LASER DIODE 104 to the power supply should be optimized and a storage capacitor introduced if necessary to enable the high current pulse. Using the DRIVER 215A as described above results in optical power of more than 15 dBm pulsed for example for 400 nSec.

The FIBER OPTIC RECEIVER SECTION 230 of the present invention further contains (in addition to the 130 section of the prior art) a DIFFERENTIAL PULSE SHAPER 216, an AMPLIFIER 217, A NOISE FILTER 218 and a COMPARATOR 219 that together are a means designed to detect the reflected light pulses. In order to achieve a higher sensitivity to detect the returning echo of the transmitted pulse a different optimized circuitry may be used. It is possible to use the LOS 120 output of the PA 110 as an echo detector for the µOTDR 200 operation, however the PA 110 is not optimized for single pulse detection since it is designed for continuous data stream. When LOS 120 is high, meaning there is no reliable data stream at the input, the µOTDR 200 is operational and the RECEIVER CHAIN 230 that is producing the SIGNAL DETECTED (SD) output 220 provided for echo detection and timing measurement. A matching circuitry depicted as differential PULSE SHAPER 216 that splits the signal at the input of the QUANTIZER 110 and direct some signal to the special portion of RECEIVER 230. Broadband AMPLIFIER 217, for example an EL8101 a linear Op Amp from Intersil, a NOISE FILTER 218 and a fast COMPARATOR (which in the present invention is a decision circuit that detects the existence of a pulse above a certain reference that is according to the noise floor) 219 complete the building block chain for the echo detector of the special RECEIVER 230 that produces the output signal SD 220. An overall sensitivity that exceeds −40 dBm can be achieved by standard design of electronic circuits. Using the special receiver as described above results in sensitivity to detect echo signals at a level of −40 dBm or better.

MICROCONTROLLER 102 that executes the STATE MACHINE 214 ALGORITHM 400 monitors both the LOS 120 and the SD 220, controls the timing of the pulse into the LD 104, is the means to measure the time until a reflection is detected, and calculates the distance to the fault. Among other things it also will calculate the timing between when the pulse was lunch at the TRANSMITTER 240 and the time the optical pulse was received at RECEIVER 230, consequently calculating the fault distance location, based on the speed of light in a FIBER 107. Additionally, the duration of the pulse and its rate are also controlled by the MICROCONTROLLER 102.

The MICROCONTROLLER 102 measures the time it take for a light pulse transmitted by the LASER 104 to travel to a fault location, reflect due to fiber imperfection and travel back to the TRANSCEIVER 100. The stability of the MICROCONTROLLER'S 102 internal clock can be enhanced with an external quartz oscillator (e.g. C-002RX-32.768K-A from EPSON) and the resolution will depend on the clock frequency. For example MICROCONTROLLER MC68HC908SR12CFA from Freescale102 operate at 8 MHz bus frequency hence enable time measurement resolution of 125 nSec which is the round trip time it takes to light travel inside 12.5 m of optic fiber. Faster microcontrollers can be used when higher resolution is required.

A MEMORY ELEMENT 115, which can be built within the MICROCONTROLLER 102 or an external one retains the timing information and enables external device readout.

The implementation depicted above enable the TRANSCEIVER 240 to measure the distance to any source of reflection when the echo signal attenuation is less than 55 dB—including the transmission loss and the fault reflection, such as a bad splice, cut, or break, with accuracy that enables quick and efficient discharge of repair technician based solely on the information provided by the TRANSCEIVER 240 and the knowledge of the network topography (mapping). The functionality of the present invention to integrate with a service provider mapping that locates all fiber routes on a real world location presentation, i.e. a map, provides an immediate graphical representation of the location of the fiber break.

The present invention accomplishes this by measuring the distance to the fault, if transmission fails, or the receiving end, if transmission is complete. The present invention does not rely on determining the length of each FIBER prior to installation. When bringing up the link the transceiver of the present invention will detect any faults or breaks in the fiber, such as construction problems like a bad splice, cuts or any defects, and if no faults exist in the fiber, the present invention will detect the actual length of the fiber cable, because the receiver at the other end reflects some of the light, which light is then detected by the present invention and the time is measured from the time the high power pulse was sent to the time a reflection was detected is used to determine the length from end to end.

It can be seen that this functionality is useful for other applications. For example, the present invention can be used with a single fiber that is wrapped around or placed alongside a power line, telephone cable, pipeline, fence and the like. If vandals cut the copper line or cable, or if the pipeline breaks, the present invention immediately knows (1) that a break occurred, and (2) the exact location of the break. This provides first responders with a significant advantage, in that they can respond more quickly, so much so that they may still catch the vandals before they have completed removing the wire, and they can respond with accurate knowledge of the terrain and pinpoint location of the break. The same can be done for fences and other structures that are long and are otherwise difficult to maintain constant observation and monitoring. It can also be used in defense applications, for example around the perimeter of a base or for national border protection, wherein the fiber is routed on top of or within the protected infrastructure or fence, such that a break of the fence will break the fiber and the event will be detected by the present invention.

The invention is applicable to any single fiber transceiver that couples to a single fiber and uses at least one channel for single wavelength transport.

Figure 2B:
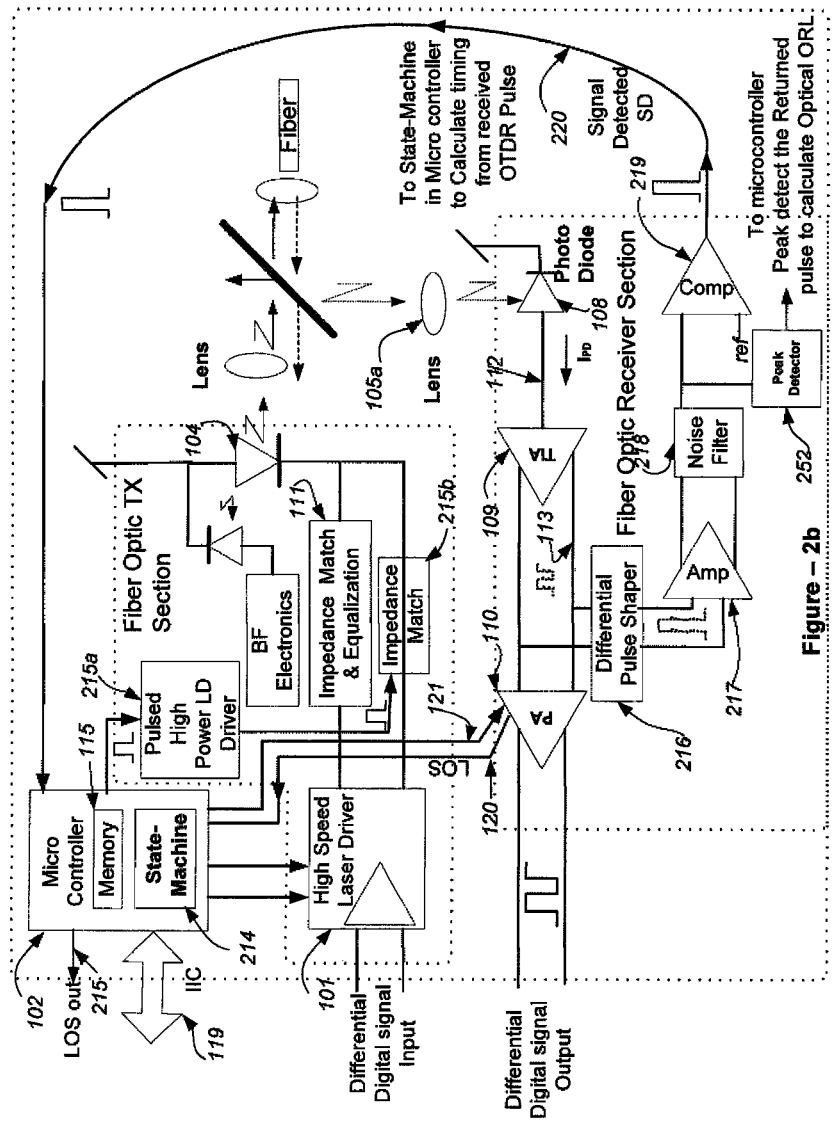
FIG. 2b is a block diagram of a bi-directional transceiver further illustrating an integrated micro optical time-domain reflectometer (µOTDR) and an including reflection amplitude measurement functionality of the present invention.

Referring now to FIG. 2b, there is shown a block diagram of the BI-DIRECTIONAL TRANSCEIVER 100 with a µOTDR 200 and OPTICAL RETURN LOSS ORL 250 measurement of the present invention.

The FIBER OPTIC µOTDR TRANSCEIVER 200 of the present invention as depicted in FIG. 2b further has the following additional functional elements:

PEAK DETECTOR CIRCUIT 252 is an electronic circuit that detects peak RF voltage delivered to known load resistance, and by doing so, the reflected pulse power will also be measured, and is also the means to measure the time to receive the echo of the reflected pulse. The PEAK DETECTOR 252 used for the present invention is fast enough to detect the pulse and discharge time and fast enough to be able detect the next µOTDR pulse. It also needs to be highly sensitive to measure small power levels. The output of the PEAK DETECTOR 252 can have a built-in logarithmic amplifier, such as ADL5513 Logarithmic detector from Analog devices, and is connected to the MICROCONTROLLER 102 via LINE 220 and is reported together with the timing of the reflection. Measuring the reflected power enabling combined with a known transmitted High Power Pulse enable immediate evaluation of the Optical Return Loss 250 from the particular fault point being measured, which is the point that is the source for the echo signal being evaluated. These measurements can quantify minor reflections that may not impede a data link, may be used to fully characterize the fiber at the time of installation and/or first time link establishment.

The additional ORL 250 measurement of particular point of reflection can be logged by the reading instrument (e.g. network switch) to monitor stability over time. For example for a good link, the transceiver at the other end reflects power. The time information for the round trip pulse transmission (coming back from the farthest reflection) is the actual link length and the ORL 250 is a direct measurement of the total losses in the fiber pulse the reflection of the remote transceiver. This information is valuable for network monitoring.

The FIBER OPTIC µOTDR TRANSCEIVER 250 as depicted above can have additional functional elements:

A SQUELCH CONTROL 121 of the POST AMPLIFIER 110 that comes from the MICROCONTROLLER 102. As long as the LOS OUT 215 from the TRANSCEIVER 200 that is control MICROCONTROLLER 102 is high the output of the PA 110 is inhibited. This inhibition reduces false and or reflected data from reaching the host equipment.

The output disable controls the data the host equipment sees and in conjunction with the link discovery process depicted in the flow diagrams (as shown in FIGS. 4a and 4b) ensures that reflected data will not be seen by the hosting equipment.

Referring now to FIGS. 3a and 3b, there is shown a Functional diagram of a fiber optic network utilizing transceiver(s) with the present invention µOTDR Functionality.

The drawing depicts the fiber optic link between Site A and Site B in two conditions:

The first condition is shown in FIG. 3a wherein there is illustrated the condition where dataflow exists, the fiber network is intact and no fiber fault is present. The second condition is illustrated in FIG. 3b, wherein there is illustrated the disruption of data flow, a fault in the fiber exists and one of the innovative elements of the present invention, the µOTDR 200

Optical Fiber Network with at least one FIBER LINK 306 connecting Site A with site B. If there are more cites, as is usually the case, many more interconnections are possible BUT each link contains at least two TRANSCEIVERS 303a 305a, one at each site, and optionally a CWDM MUX/DMUX 304 at each side as depicted in the FIG. 3.

One or more μOTDR 200 capable TRANSCEIVERS 303a, 305a at Site A and one or more TRANSCEIVERS 303b, 305b at Site B. Those can be operating on the same or on different wavelengths, and an μOTDR TRANSCEIVER 303a, 305a of the present invention can be connected to a non-OTDR TRANSCEIVER, and work within the scope of the present invention, but with a limiting functionality, single ended, of the network fault detection capabilities.

A SWITCH 302 or Media Converter or Router or any other networking apparatus 302, is designated as host equipment that, can interface with fiber optic TRANSCEIVER 303a, 305a and process data stream in one or more protocols, with at least one in Site A and at least one (similar or different) in Site B. Both SWITCHES 302 on the same link must be capable to communicate in a common protocol (with Auto negotiation or with manual setup).

An optional CWDM MUX/DMUX 304 that enables combining few data streams of different wavelength (depicted as $\lambda_1$ to $\lambda_n$) on the same FIBER LINK 306, with one at each end of the network.

FIGS. 3a and 3b also show other TRANSCEIVERS 303b, 305b (with or without the μOTDR 200 capability) connecting to the SWITCH 302 and then connecting to other (or same) CWDM MUX/DMUX 304.

Preferably each host equipment SWITCH 302 has a capability to report in a generalized way the data it retrieves from the TRANSCEIVER(S) 303a, 303b, 305a, 305b with μOTDR 200. Such means for reporting can be SNMP (Simple Network Management Protocol). SNMP is an "Internet-standard protocol for managing devices on IP networks." Devices that typically support SNMP include routers, switches, servers, workstations, printers, modem racks, and more. "It is used mostly in-network management systems to monitor network-attached devices for conditions that warrant administrative attention. SNMP is a component of the Internet Protocol Suite as defined by the Internet Engineering Task Force (IETF). It consists of a set of standards for network management, including an application layer protocol, a database schema, and a set of data objects.

The SWITCHES 302 or any other host equipment that utilizes TRANSCEIVERS 303a, 303b, 305a, 305b for fiber optic communication can be connected to a NETWORK 301 enabling local and/or remote interrogation of the μOTDR 200 operating within utilizes TRANSCEIVERS 303a, 303b, 305a, 305b, as well as many other parameters customarily monitored for NETWORK 301 elements. Some SWITCHES 302 allow direct connection to a computer via a TERMINAL INTERFACE. Such readout can be used locally at the Site.

State Machine

The STATE MACHINE FIRMWARE 214 controls the functional flow of the μOTDR 200 operation. The functionality of a regular transceiver is not described here. It is important to note that in this description the validity of incoming optical signal into the "standard" elements of the TRANSCEIVER 100 is designated by lack of LOS 120, 120a (LOSS OF SIGNAL), or in other words LOS is Low or LOS=0, where is a presence of reflection during μOTDR 200 operation is designated here as SIGNAL DETECT (SD) 220. Reporting to the link status to the host equipment SWITCH 302 is called LOSOUT 215.

The sequence of operation is depicted in the flow diagram shown in FIGS. 4a and 4b illustrating the STATE MACHINE FLOW ALGORITHM 400. Referring now to FIGS. 4a and 4b, there is shown the firmware flow diagram for the TRANSCEIVER 303a, 303b, 305a, 305b, with μOTDR 200 hardware capabilities.

There is shown in FIG. 4a, that when the TRANSCEIVER 303a, 303b, 305a, 305b is powered at STATE 410, the INITIAL STATE 420 is Tx—Disable. Tx LASER DRIVER 101 can be enabled or disabled by the MICROCONTROLLER 102. For example the MICROCONTROLLER can suppress both the BIAS 117 and MODULATION 118 and the LASER TRANSMITTER 104 will not send any optical output. There are other ways to ensure that the LASER 104 will not emit power. Most TRANSCEIVERS 303a, 303b, 305a, 305b also have an external control through which the HOST EQUIPMENT SWITCHES 302 can force the TRANSCEIVERS 303a, 303b, 305a, 305b NOT to emit any light. Also the LOSOUT 215 (remember LOSS OF SIGNAL OUTPUT is a binary state that reports to the HOST EQUIPMENT 302, it is high when the received signal is missing or inappropriate) is kept high. The flow proceeds to the DECISION POINT 440 that is looking for Low LOS 120 (remember LOS 120 is an internal variable that reports the received signal state at the POST AMP/QUANTIZER 110 wherein low means good signal for data communication). If LOS 120 is low for at least 10 mSec, indicating input of steady source of light from the FIBER 107, the Yes output 440b goes to check whether there is an external control (e.g. from the HOST EQUIPMENT 302) that Disables the Transmitter at DECISION POINT 442. If not, then the TRANSMITTER 104 is enabled. The LOSOUT 215 state is now identical to the LOS 120 (normal operation) and the unit returns to STATE 440. For normal operation when the FIBER transports data the LOS is always low and the state machine is continuously looping through 440 to 442. When LOSOUT 215 is low, the MICROCONTROLLER 102 controls the output of the PA 110 (i.e. the Quantizer circuitry) via line 121 such that a PA 110 that employs squelch operation releases the data stream to the output of the transceiver. Without the PA 110 squelch the data at the output is noisy and unpredictable when the signal is at very low levels (below the level sufficient to trigger Low LOS 120). At this condition the STATE MACHINE 214 is checking through the loop described above and data is presented at the output of the TRANSCEIVERS 303a, 303b, 305a, 305b.

If at STATE 440 the LOS 120 is not Low for 10 mSec and LOS 120 is high for more than 100 mSec (basically each test can wait up to 100 mSec to wait for Low LOS 120) the flow branches to the No BRANCH 440a, and the STATE MACHINE 214 enables the Tx-data (or idle signal) from the HOST EQUIPMENT 302 is transmitted to the FIBER 107 when Tx Enable is High and the initial LOSOUT 215 state is kept High—the HOST EQUIPMENT 302 is signaled that no available data is to be expected. That was the condition leading into decision branch 440.

If the present invention detects at STATE 460 a valid signal LOS 120 Low on upon turning the Tx ON at STATE 450 it can be due to reflection in the FIBER NETWORK 306 (e.g. open SC-UPC connector will reflect partial power back to the source due to Fresnel glass to air interference). The present invention will continue to transmit data for a random time of 1-3 see, at STATE 462. The random time transmit at STATE 462 is done to enable detection of the light at the other end of the link. The reason for the random timing at STATE 462 is to ensure that the two units, that operates at the two ends of the link, are not synchronized—ensuring that there will be a time slot when one Tx is enabled while the other can detect it as an external source at DECISION POINT 440. Following the random Tx ON time, the TRANSMITTER 104 is turned off (Tx Disable) at STATE 463. Now the LOS 120 condition is checked at DECISION POINT 441 and if LOS 120 is Low, meaning that there is an external source of optical energy, then present invention will commence operation normally, through the Yes BRANCH 441*b* to 442 as depicted above.

If the unit does not detect valid signal LOS 120 Low for >10 mSec immediately upon turning the Tx ON, at DECISION POINT 460, then at STATE 469 followed by STATE 465 the present invention will transmit data for a random time of 1-3 sec, similarly to the above description. Afterwards the LOS 120 condition is checked at DECISION POINT 441 and if it's Yes (meaning that there is an external source of optical energy) the unit will commence operation normally as depicted above, from 441 to 442 and then continuous looping 440 to 442 and back. This STATE MACHINE 214 operation is one of the means that distinguishes between the reflection of the TRANSCEIVER and the incoming optical power.

In the case that LOS 120 (for 10 mSec) is not Low at decision point 441, external signal is not detected at 441 the STATE MACHINE branches, through the No branch 441*a*, to μOTDR operation. The No branch 441*a* continues on FIG. 4*b*. The points 1, 2, and 3 at FIG. 4*a* connect directly to points 1, 2, and 3 at FIG. 4*b*.

FIG. 4*b* depicts the reflection measurement flow of the μOTDR operation. In state 443, coming from point 2 the TFR (an internal variable that represents the round trip time of last reflection) is set to 0 and the reflection counter j is also set to 0. Next step, at 444, the HPP (High Power Pulse) counter (n) is set to 0 since no pulse was transmitted yet for the current measurement cycle. High Power Pulse (for example 489 nSec wide) is sent via the DRIVER CIRCUITRY 215*a* and 215*b* to the LASER 104. An internal timer starts at the end of the HPP, waiting for TFR before looking for reflection echo. At the first time TFR is 0 and the DECISION POINT 445 will be entered immediately. However, if there were already measured reflections and the TFR is NOT 0 those reflections already detected will be ignored and the decision POINT 445 will be entered only after waiting for the time it took to detect the previous reflection(s) looking for reflections farther away from those already accounted for. At DECISION POINT 445 the status of SD 220 from the COMPARATOR 219 is checked.

If no echo is detected SD 220 will not turn high and Tn will be set to 0.

If SD 220 is Detected the timer records the time from end of HPP to the time a signal is received as Tn.

After the Tn is recorded the STATE MACHINE 214 verifies if 3 HPP were sent in the current condition (same TFR) at decision point 446. The n counter is recording how many times the measurement with the current TFR is repeated. If the amount of tests has not reached the prescribed goal, 3 in this example (N=the number of repeated tests, can be any number chosen by the designer) n is incremented (n=n+1) and after total time delay of 651 μSec measured from the time the HPP was transmitted (this is the time we expect any reflection from a distance up to about 65 km) another HPP is transmitted. After transmitting the HPP n times (in the figures N is 3 as an example) the N records of the time to reflection (Tn) are compared at DECISION POINT 447 (within 1 μSec representing reflection from a region of about 100 m length). If they are the same AND different from 0, then there is a valid fault detection. The average Tn from the 3 measurements is recorded as TRj—time to jth reflection. TFR is set to be TRj+1 uSec (ready to detect reflection 100 m farther away), j counter is incremented, and HPP loop restarts for the next reflection by going back to BOX 444. The j counter is the counter of valid reflections. Going back to 444 continues the measurement, looking for farther reflections.

If the N (e.g. 3) Tn are different or are equal to 0 (if they are all 0, then no reflection was detected, or if they are different indicating noisy measurement which is inconclusive and is ignored) the j counter is checked at DECISION POINT 448. If it is 0—no reflection was detected LOSout 120 is set to normal operation (looking at the output of the PA Quantizer and providing the signal to the host equipment) looping back to DECISION POINT 440. If j is not 0, indicating the last measurement was not valid, but previously valid measurements do exist, TRj of all prior j measurements is converted to distance by the MICROCONTROLLER 102 and recorded in the TRANSCEIVER MEMORY 115 (e.g. in page A2 of the EEPROM) the status of reflection, and the number of reflections are also recorded in the unit MEMORY 115 and the flow of the STATE MACHINE continues to go back to 440.

Referring now to Table 1 below, there is shown a Data Presentation structure—enabling extracting fault information from the transceiver(s)

The way data that can be presented to the HOST EQUIPMENT 302 by the transceiver memory according to present invention is depicted in Table 1. The data structure enables interrogation of the OTDR transceiver for multiple reflections. The distance to the farthest location is the default data presented in the example. The user (via SNMP or other means through the host equipment) can write the index of a closer reflection and get the actual distance to it. If power measurement capability, as depicted in FIG. 2*b*, is implemented in the TRANSCEIVER the ORL for each fault is reported as well index as above in Byte 127—for example.

It is customary to include information within the transceiver memory that is accessible to the user. In the example below we use memory addresses that are available to use in the broadly accepted industry specification, but any address bytes or organizations of the address byte is clearly depicted here.

This data readout structure is a specific example of a general methodology that enables to save multiple reflections and read the reflections one at a time. It is designed to minimize memory usage while giving the user ultimate flexibility. The default presented values are for the farthest detected reflection.

TABLE 1

μOTDR Specific Codes in MICROCONTROLLER memory

| Byte | No | Name | Description |
|---|---|---|---|
| 123 | 1 | OTDR_cntl | This Byte is user Read/Write |
| | | | Bit Description |
| | | | 7   1 request update for information in bytes 124-127 based on index in bits 0-4. OTDR software automatically resets bit 7 of byte 123 when the new index is processed. |
| | | | 6   1 enables the μOTDR 0 disables the μOTDR (take up to 1 sec for |

TABLE 1-continued

µOTDR Specific Codes in MICROCONTROLLER memory

| Byte | No | Name | Description |
|---|---|---|---|
| | | | update to propagate to Byte 124) |
| | | | 5 — 1 enables the Delta Power Sensor (DPS); 0 disables the DPS |
| | | | 4 — 1 enables (forces) single µOTDR measurement after DPS event (power delta detected) or after external Tx Disable. This state is named "Sense Priority"; 0 will cause DPS detection, to be followed by a link test - hence named "Link Priority) and Tx Disable will not initiate a µOTDR measurement. The bit is designated Run OTDR_once. |
| | | | 0-3 — Numeric integer (4 bits representing an integer 0 to 15, bit 0 is LSB) that represents the index for the requested data. The largest index - [the Number of Reflections - 1] - is for the farthest reflection. Index 0 is for the first (closest to the unit) reflection. If the value is higher than the highest fault index [the Number of Reflections - 1] the highest index (farthest reflection) and its data are presented in Byte 124. When the µOTDR is Enabled (bit 6) the every new measurement will overwrite the values with the actual number of reflection detected. |
| 124 | 1 | OTDR_Status | This Byte is user Read |
| | | | Bit Description |
| | | | 7 — 1 data was not read; 0 data was read. The Bit is set any time fresh data is introduced to 125-127, after µOTDR test and after a command per bit 7 Byte 123. The bit is reset to 0 every time Byte 126 is read. |
| | | | 6 — OTDR status (1 enabled or 0 disabled) |
| | | | 5 — 1 indicates this unit has µOTDR software |
| | | | 4 |
| | | | 0-3 — Numeric integer (4 bits representing an integer 0 to 15, bit 0 is LSB). The INDEX of the fault depicted in Bytes 125-127. Default is the farthest location - the INDEX is the reflection count. 0 means NO Reflections |
| 125-126 | 2 | Dist_Fault | Distance to fault - value of 0 to 65536 meters - 2 bytes Byte 125 is MSB (This Byte is user Read). The scaling to distance from the timing data generated above is done by the MICROCONTROLLER 102 prior to storage in the memory 115. |
| 127 | 1 | ORL_Fault | Reflection Amplitude - positive number for the ORL that represents 0.25 dB/count (This Byte is user Read) the value generated by the peak detector 230 and stored in the memory 115 by the MICROCONTROLLER 102. |

The data in Bytes 124-126 updates after each measurement, following the record in Memory 115 after proceeding through the No branch 448b of decision point 448. While the unit is NOT LINKED reading multiple reflections results via control of Byte 123 necessitates disabling the µOTDR (Bit 6 Byte 123 should be 0) throughout the process of reading multiple reflections, otherwise the new fresh data of µOTDR measurement will overwrite previous results while the user is in the process of reading the data.

Figure 5:
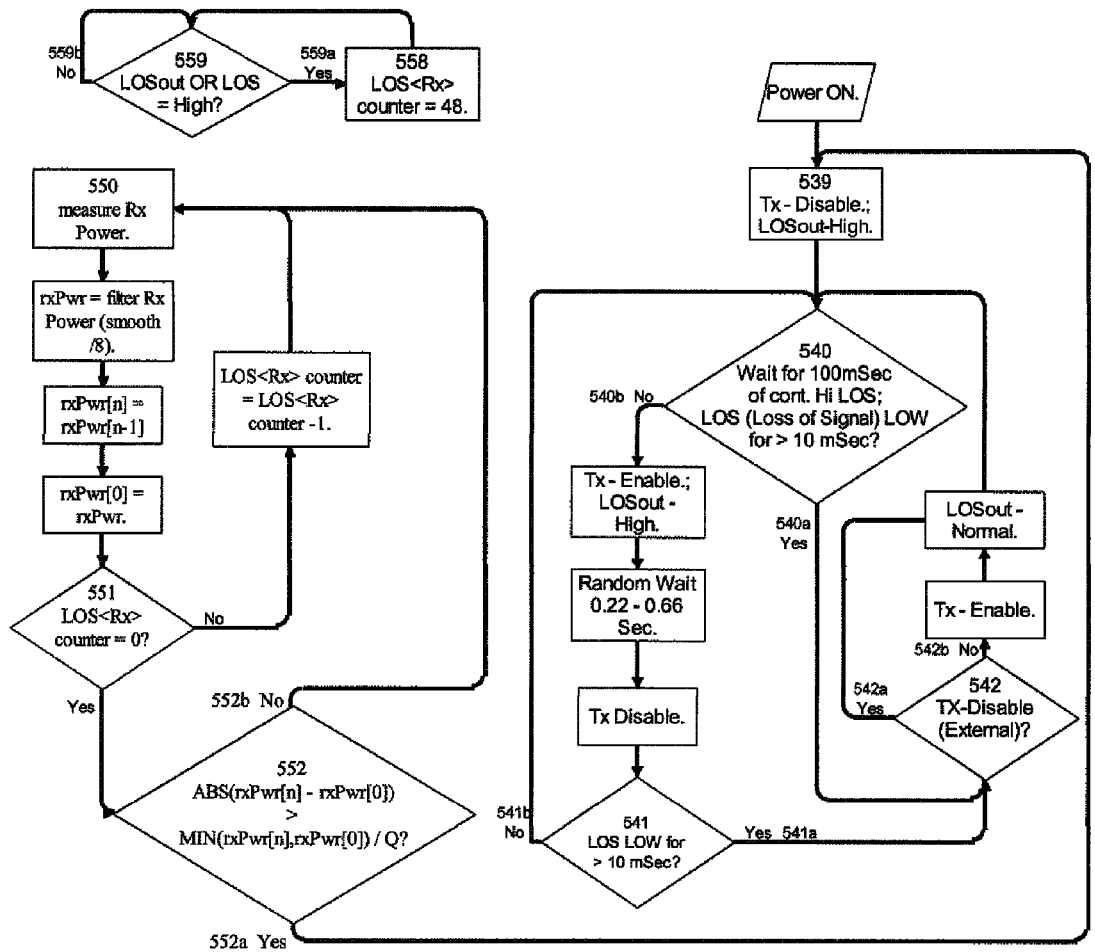
FIG. 5 is operation flow diagram for the Reflection Immune Operation (RIO) of the present invention.

Referring now to FIG. 5, there is shown a STATE MACHINE flow diagram for Reflection Immune Operation of a single fiber single wavelength optical transceiver.

The diagram represents the functional flow of an additional implementation that can be added to µOTDR operation. This additional innovation relates exclusively to single fiber single wavelength transceivers. The additional independent innovation as described herein applies to any single fiber single wavelength transceiver (with or without the µOTDR) and enables Reflection Immune Operation. The functionality of a regular TRANSCEIVER is not described here, except when monitored as part of the logic operation. It is important to note that in this example, the validity of incoming optical signal into the "standard" elements of the TRANSCEIVER is designated by lack of LOS 120 where there is a presence of reflection during µOTDR operation is designated here as Signal Detect (SD) 220 and the output function delivered to the HOST EQUIPMENT by the TRANSCEIVER (i) via a designated OUTPUT PIN 215 and (ii) a readout field via the IIC, status kept in MEMORY 115. This advanced implementation enables detection of input power change, and initiates the µOTDR measurement based on detection of such change. The change can be if the FIBER is bent abruptly hence creating a reflection, if someone is trying to couple power out of the fiber link for monitoring or when the FIBER is opened and the CONNECTORS are not angle polished so the reflection form an open fiber connector (−14 dB is the reflected power intensity for non-angled termination) is still within the sensitivity range of the RECEIVER. The detection of power change also solves one of the main deficiencies of single wavelength operation—data in the reflected signal can be processed by the TRANSCEIVER as a valid dataflow from the other side of the link (while in reality it is the data that the same TRANSCEIVER is sending and is reflected when a non-angled connector is open and there is no link, or any other reflection source including a non-powered transceiver at the other side of the link).

The situations when reflection can affect the link and/or confuse the operator are: i) TRANSCEIVER is plugged into an equipment but the FIBER LINK is not completed, ii) a link is completed but the other side is not powered—the reflection can come back from the far non-powered TRANSCEIVER, and iii) the link is open, has a bad splice, a dirty connector, a broken adaptor, or broken fiber and the point of disconnect has significant optical reflection. When an active fiber link, (dataflow goes both directions) is disconnected by opening of any non-angled connector the power reflected from the connector is changing—even very slightly when the steady state reflected power from a connector (at the receiver) is the same as the power that was received from the other side while the link was active. The reason for the minute change is the instantaneous interference that can actually spike the power when two flat optical terminations are separated by a very small distance. Since the mechanical action of opening a connector is measured in mSec time frame, the optical power undergoes variations between two equal steady state conditions. This variation can be detected as described herein thus enabling comprehensive Reflection Immune Operation. The detection of an "event" (small power change) can be used to trigger a μOTDR measurement (sense priority), or to check if the link is still valid (link priority). In link priority, the possibility to generate a link with the other side is checked first such that the link will be recovered as soon as possible. In sense priority, a single μOTDR measurement will take place before trying to establish a link, hence keeping a record of the disturbance if detected. The implementation is depicted such that it can be implemented without μOTDR operation, just improving standard single fiber single wavelength transceiver operation. With this STATE MACHINE 214 operation in conjunction with the μOTDR measurement, the TRANSCEIVER can distinguish between the reflected signal and the incoming signal following a break. This is another means by which the present invention distinguishes between the optical power of a transmitter and an incoming optical data stream from a remote transceiver.

The Reflection Immune Operation (RIO) depicted in this patent application is applicable to any standard single fiber single wavelength transceiver. The functionality depicted above, that of detecting change in the incoming optical power, is called Delta Power Detector (DPSO) and it can be enabled or disabled via user control in bit 5 byte 123 (see Table 1).

RIO Operation

The reflection immune operation (RIO) as described below, is comprised of two elements: i) detection upon LOS High if the local transmitter power is reflected—(in the absence of incoming power)—but still allowing for normal link to be recognized, and ii) delta power measurements during normal linked status. Each of the features can work independently but combined they cover all the operational conditions of single fiber single wavelength TRANSCEIVER.

The sequence of operation is depicted in the STATE MACHINE diagram illustrated in FIG. 5. When the TRANSCEIVER is powered the INITIAL STATE (539) is Tx-Disable (the local transmitter is shut down-no output power) and LOSout 120—a binary state that reports to the HOST EQUIPMENT, e.g. SWITCH) is high indicating that the received signal is missing or inappropriate. The unit at decision point 540 is looking for detecting a valid input power indicated by LOS Low for at least 10 mSec, LOS (Loss of Signal is an internal variable that reports the received signal state at the Quantizer/PostAmp 110—low mean good signal for data communication)—if LOS is low for at least 10 mSec (indicating external steady source of light) the unit goes to check whether there is an external control (e.g. from the switch) that Disables the Transmitter at STATE 542. If not, then at STATE 542b—the Transmitter is enabled. The LOS state is now becoming normal operation LOSout=LOS the output LOS is directly indicating the status of the Quantizer/PostAmp 110 and the unit returns to STATE 540. When LOS is low the Quantizer/PA 110 that generates it and employs squelch operation release the data stream to the output of the transceiver. Without the Quantizer squelch the data at the output is noisy and unpredictable when the signal is at very low levels, usually below the level sufficient to trigger SD. At this condition the STATE MACHINE 214 is checking through the loop described above and data is presented at the output of the TRANSCEIVER.

If at STATE 540 the LOS is High for more than 100 mSec the unit branch through the No 540b BRANCH and enables the Tx—data (or idle signal) from the switch is transmitted to the fiber when Tx Enable is High and the initial LOS state is High—that was the condition leading into this branch. The Tx Enable can be conditional on The Soft Tx Disable or the Tx Disable pin that are defined in the MSA for SFP TRANSCEIVERS.

The unit will transmit data for a random time of 0.22-0.66 sec. Afterwards the Tx is Disabled and the LOS is queried at STATE 541. If it is LOW that means that a remote source is generating the power (meaning that there is an external source of optical energy) and the unit follow to STATE 542 into normal operation as depicted above. If the LOS is High the TRANSCEIVER can move into the actual μOTDR operation not depicted in FIG. 5 or back to 540 to continue to monitor the incoming power—waiting for the other side. This NO branch 540b is enabling transmission to the other side to generate a link even if there are some reflections. The other side, if equipped with the same features, will detect the incoming light and will go through similar steps to 542 and 540 for normal operation. If the other side is a regular transceiver it transmits all the time and it will be detected at STATE 540 and the link will be established. The random time ensures that both sides, equipped with this feature, will not synchronize. Such operation is useful for units without μOTDR to avoid locking on its own reflected signal. This is the first element of reflection immune operation.

In the following, the delta power detector is described. The flow diagram in FIG. 5 depicts simple independent loop starting at 559 that resets the value of the LOS<Rx> counter in step 558 to 48 as an example. This initial value, that can be designed to be much smaller (e.g. 8) or bigger (e.g. 128), represents the number of sampling events that must pass before another monitoring function starts. LOS<Rx> is a counter that counts down every time a new input power is measured. Rx Power is the input power measurement value and it is typically implemented in fiber optic transceivers and is not explained here.

In order to measure changes in the incoming optical power, which may have originated due to fiber handling, disconnect, etc., an algorithm depicted below is used to eliminate measurement noise. Other digital filtration and/or smoothing can be used and what is depicted here is for example only. Every cycle of the internal micro-controller 102 the input optical power is measured (designated measure Rx Power) and stored, in flow box 550. Individual measurements are noise susceptible so a smoothing filter is used. In the example. there is used a smooth/8 filter that generates an internal variable rxPwr that represents a smoothed measurement value:

$$rxPwr = rxPwr + (\text{measured}Rx\ Power - rxPwr)/8 \quad \text{(Equation 1)}$$

After each measurement cycle all the previous values are retained internally in sequence. Up to n values of smoothed input power are kept in memory 102. N can be 48 for example. The latest value of the smoothed power rxPwr is rxPwr(0) and the "oldest" in our example is in a generalized form rxPwr (n−1). The LOS<Rx>counter is checked to see if the minimum number of measurements (48 in our example) was completed at decision box 551. If not, through the No branch 551b the LOS<Rx>counter is decremented and the loop returns to 550. After the minimum measurements were accumulated the LOS<Rx>counter is set to 0, and it will remain 0 until LOS High will be detected in 559. Once the amount of measurements are sufficient the rxPwr(0)—latest smoothed value is compared with rxPwr(n) to check if the difference is bigger than a set threshold (552).

The formula depicted is:

$$ABS(rxPwr[n] - rxPwr[0]) > MIN(rxPwr[n], rxPwr[0])/Q \quad \text{(Equation 2)}$$

The formula depicted (552 in FIG. 5) uses Q variable to scale in reference to the smallest power of the two, rxPwr(0) and rxPwr(n).

If the difference is bigger than the set threshold—the decision point 552, through the Yes branch 552a, will return the transceiver to flow-box 539—monitoring the input power and causing the restart of the μOTDR operation, if implemented. The variable Q effectively sets the relative power change. Here are some values for different value of Q:

TABLE 2

| Q | dB change |
|---|---|
| 1 | 3.01 |
| 2 | 1.76 |
| 4 | 0.97 |
| 8 | 0.51 |
| 16 | 0.26 |

If the change of power was caused by opening the optical fiber at a point with high reflection (open UPC connector for example) the detection at 540 will indicate no incoming power and the loop will proceed in the same way as in the case when the transceiver was powered with no incoming light. Without this algorithm the reflected power will be detected by the Quantizer/PA 110 LOS 120 will stay low and the output signal will be exactly the input signal—which is a case we want to avoid.

Referring now to FIG. 6, there is shown an alternate embodiment of the state machine flow of the present invention.

Figure 6A:
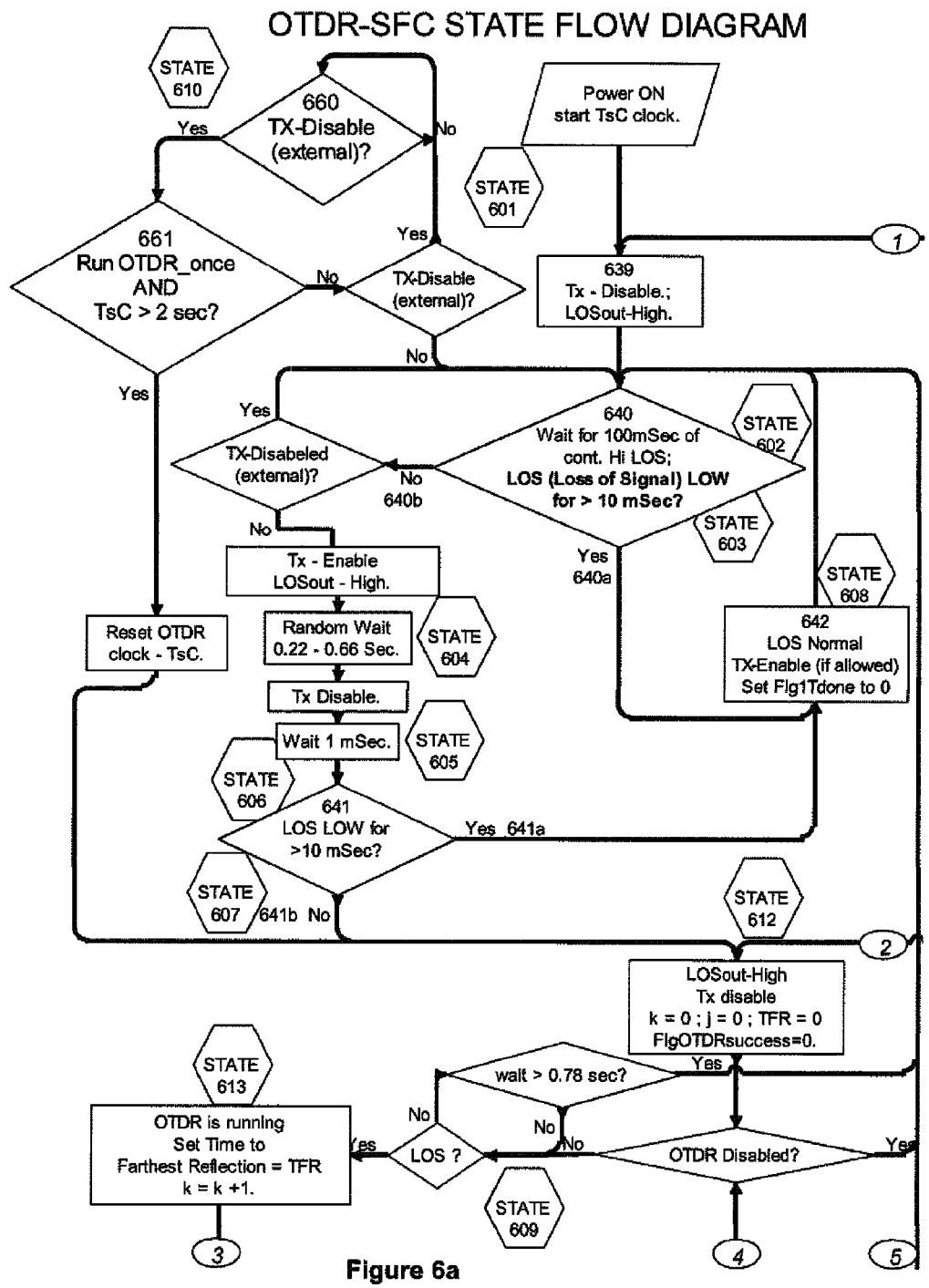
FIG. 6a is the first part of an operation flow diagram of an alternate embodiment of the μOTDR operation depicting the control of the conditions that will initiate the μOTDR measurement of the present invention.
Figure 6B:
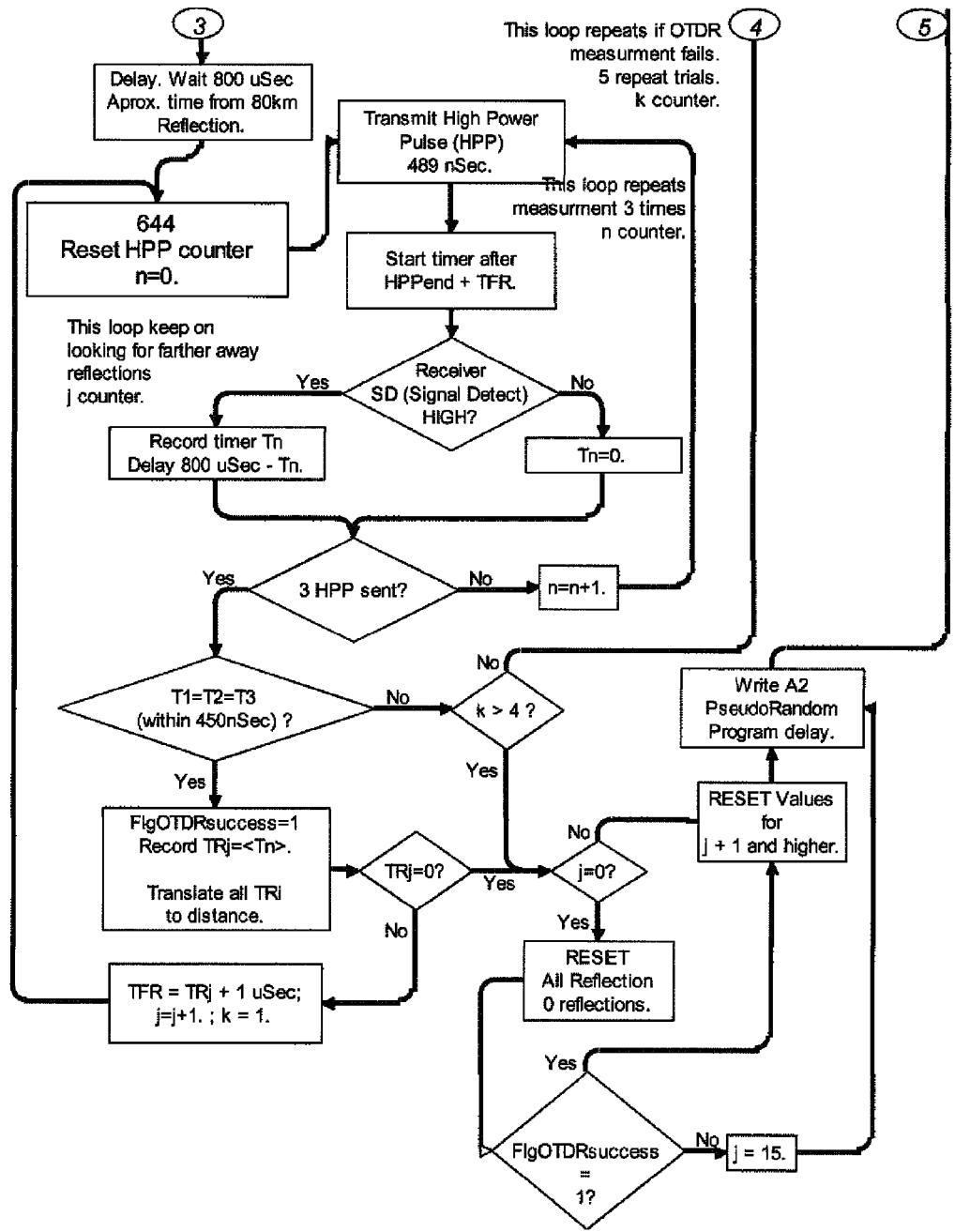
FIG. 6b is the second part of an operation flow diagram of an alternate embodiment of the μOTDR operation depicting the distance measurement protocol of the present invention.
Figure 6C:
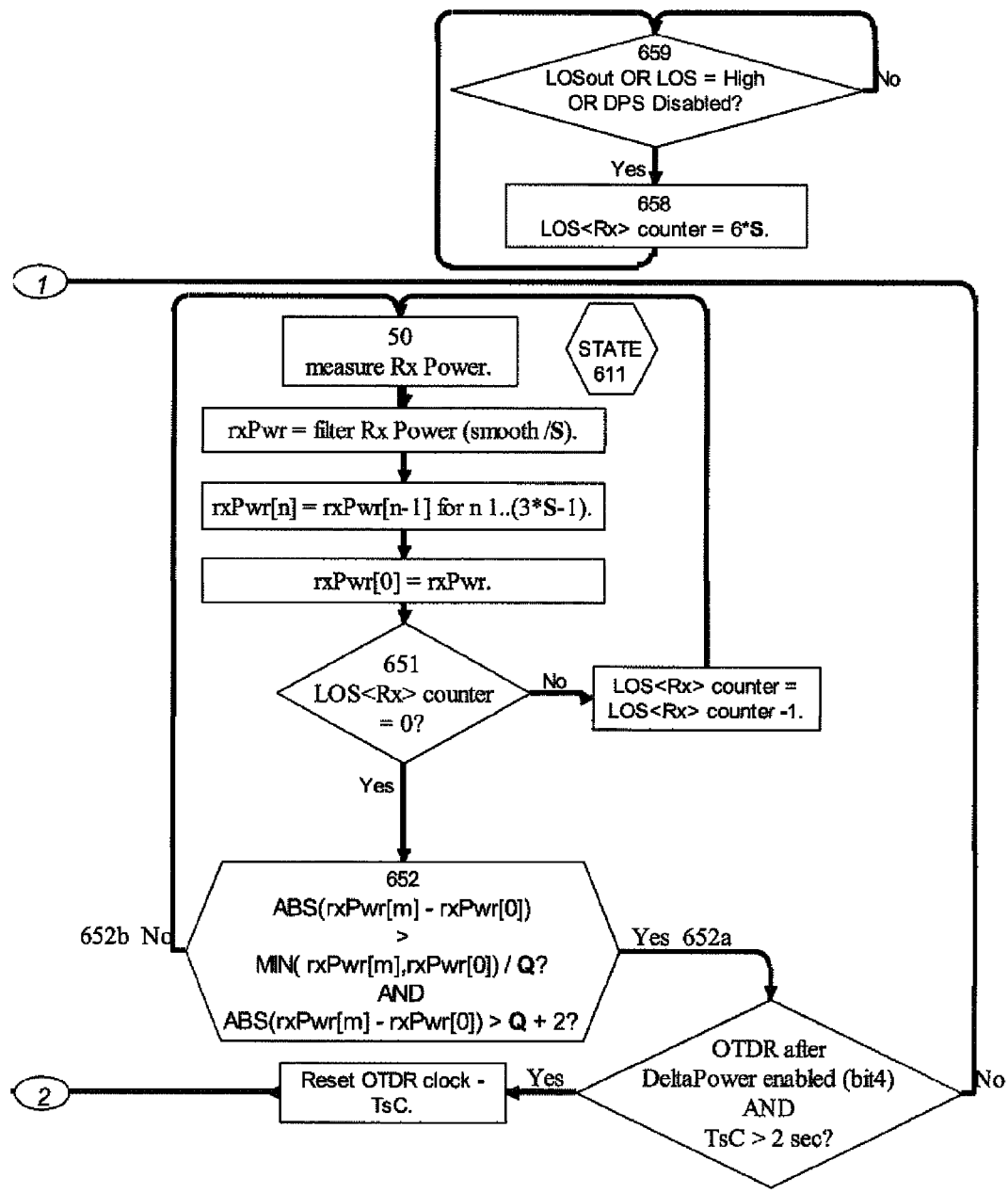
FIG. 6c is the third part of an operation flow diagram of an alternate embodiment of the μOTDR operation depicting the integration of Delta Power Measurement into the μOTDR operation of the present invention.

The sequence of operation is depicted in the state machine diagram. FIGS. 6a, 6b and 6c is based on the prior depiction in FIGS. 4a and 4b combined with the features of FIG. 5 with additional refinements. All flow diagrams are self explanatory and anyone familiar with the art of controlling optical transceiver via software routines can understand and implement those. For further clarity, there is provided a detailed explanation throughout the application.

In the implementation described here includes the following capabilities:

Measuring multiple reflections (counter j)

Repeating each measurement a few times to increase validity (counter n)

Recovering from a bad measurement and retrying a few times (counter k)

Recognizing self reflection when there is no input power from the other side

Enabling the DPS to initiate a μOTDR measurement

Enabling external Tx Disable to initiate one μOTDR measurement

In FIG. 6 the STATE numbers are depicted in a hexagonal border. Flow boxes important for the explanation below, as in previous figures, are also numbered. Connections from page to page are indicated in a number within an ellipse. To provide further clarification there is provided the following state table:

TABLE 3

| STATE | DESCRIPTION |
|---|---|
| 601 | Power ON |
| 602 | Start LOSCHECK |
| 603 | CHECK LOS |
| 604 | WAIT RANDOM DELAY |
| 605 | WAIT QUITE (ensure all reflected power from afar is gone) |
| 606 | SETUP 41 |
| 607 | CHECK LOS (low LOS w/o Tx) |
| 608 | Tx ENABLED |
| 609 | START LOSCHECK 1 ( = START LOSCHECK) |
| 610 | START Tx DISABLE |
| 611 | START DPS |
| 612 | START μOTDR Measurement |
| 613 | RUN μOTDR |

The operation starts in FIG. 6a. When the transceiver is powered TsC clock (a clock that measure the time since the unit was powered or since the latest μOTDR measurement whichever is the most recent) is initiated and the flow moves to the STATE 601 and immediately to INITIALIZATION 639 the initial conditioning of the μOTDR flow, that is Tx-Disable (the local transmitter is shut down—no output power) and LOSout (Los of Signal Output—a binary state that reports to the host equipment, e.g. Switch) is high indicating that the received signal is missing or inappropriate. STATE 602 (Start LOS Check) is at the entrance to DECISION POINT 640. At DECISION POINT 640 the state machine is looking for detecting a valid input power indicated by LOS Low for at least 10 mSec. LOS 120 (Loss of Signal 120 is an internal variable that reports the received signal state at the QUANTIZER/POSTAMP 110—low mean good signal for data communication)—if LOS 120 is low for at least 10 mSec (indicating external steady source of light), STATE 603, YES BRANCH 640a, the unit goes to check whether there is an external control (e.g. from the switch) that Disables the Transmitter at STATE 642 and the TRANSMITTER is conditionally enabled (if Tx Enable is allowed) and the flag Flg1Tdone to 0. The Flg1Tdone indicates if at least one μOTDR measurement was successfully conducted. The LOS state is now becoming normal, LOSout=LOS, the output LOS is directly indicating the status of the QUANTIZER/POSTAMP 110 and the unit returns to STATE 602 and DECISION POINT 640. When LOS is low the QUANTIZER/PA 110 that generates it and employs squelch operation release the data stream to the output of the transceiver. Without the QUANTIZER squelch the data at the output is noisy and unpredictable when the signal is at very low levels (below the level sufficient to trigger SD). At this condition the state machine is checking through the loop described above and data is presented at the output of the transceiver.

The external input into the transceiver that controls the transmitter—called Tx Enable (external) is provided by an input hardware line and/or via IIC 119 as a soft Tx Disable—is constantly monitored in 660. As long as external override is not detected the local loop keeps checking at 660. If external control is detected the unit checks at 661 if more than prescribed time (e.g. 2 sec) AND the Run μOTDR_once control is set (see bit 4 byte 123 in Table 1) the TsC clock will be reset and the flow will go to State 612 (Start μOTDR measurement). If the TsC clock time is less than the prescribed time, OR the Run OTDR_once is not enabled, the flow will return to STATE 602 and to DECISION POINT 640. This sequence enables forcing of μOTDR measurement with external control of Tx Disable.

If at DECISION POINT 640 the LOS is High for more than 100 mSec the unit branch through No leg 640b, checks again if external Tx Disable was not introduced, and enable the Tx—thus data (or idle) from the host equipment is transmitted to the fiber when Tx Enable is High—and the initial LOSout is High—that was the condition leading into DECISION POINT 640. The Tx Enable is conditional on The Soft Tx Disable or the Tx Disable pin that are defined in the MSA for SFP transceivers.

The No 640b leg out of DECISION POINT 640 is enabling transmission (if there is no outside Tx Disable) to the other side to generate a link even if there are some reflections. The other side will detect the incoming light and will go through similar steps to 642 and 640 for normal operation. The random time ensures that both sides will not synchronize. Such operation is useful for units without μOTDR to avoid locking on its own reflected signal.

The unit will transmit data for a random time of 0.22-0.66 sec, STATE 604. Afterwards the Tx is Disabled and the units wait for an additional 1 msec to ensure that any reflections from the fiber from remote location will already be gone, and then the LOS is queried (641). If it is LOW that means that a remote source is generating the power (meaning that there is an external source of optical energy) and the unit through the YES BRANCH 641*a* follows to box 642, STATE 608, into normal operation as depicted above. If the LOS is High the transceiver can move via the No branch 641*b* into the actual µOTDR operation, starting at STATE 612.

The µOTDR operation starts with initialization: the TFR (internal variable that represents the round trip time of last reflection) is set to 0, the repeat measurement if failed k is set to 0, the flag FlgOTDRsuccess is set to 0, and the reflection counter j is also set at 0. Next step, the state machine checks if the µOTDR is disabled (can be disabled via bit 6 byte 123 in Table 1 for example). If it is disabled the unit returns to, STATE 602, if not it enters, STATE 609 checking for LOS 120. To enable measurement it should be High—no incoming power—because incoming power will interfere with operation and indicate an operational transceiver at the other side of the link. The LOS 120 check continuously for, as an example, 0.78 sec (longer then the random wait states Tx enable). If LOS 120 remains low for longer time the unit returns to, STATE 602. Once LOS 120 is high the unit enters, STATE 613 RUN µOTDR, the k counter is incremented and TFR is set to the last recorded reflection time (0 if it is the first entry to STATE 613). Connector 3 on FIG. 6*a* continues to 3 on FIG. 6*b*. Further delay is introduced to ensure that optical line does not have reflections from a previous pulse (in the case we got to this stage after a failed measurement pulses travelling in the fiber must be allowed to purge)—for example 800 mSec. Next the HPP (High Power Pulse) counter (n) is set to 0 since no pulse was transmitted yet for this measurement cycle. High Power Pulse (for example 489 nSec wide with peak power of 15 dBm) is sent via the driver circuitry (215*a* and 215*b*). An internal timer starts at the end of the HPP after waiting for TFR, such waiting ignores the reflections from closer faults already accounted for.

If no echo is detected, the output of the comparator 219, SD 220 will not turn high and Tn will be set to 0.

If SD is Detected the timer records the time from end of HPP to the time a signal is received as Tn.

After the Tn is recorded the STATEMACHINE verifies if n (3 in the example) HPP were sent in the current test. If not—n is incremented and another HPP is transmitted. After transmitting the pulse n (e.g. 3) times the three records of the time to reflection (Tn) are compared (same time to reflection within a tolerance of 450 nSec—less than 50 in variation)—if they are the same—hence valid measurement—the average Tn from the n measurements (n is 3 in this example) is recorded as TRj—time to jth reflection and the FlgOTDRsuccess is set to High and the TRj time is converted to distance. It is possible that the n measurements will all be 0 no reflection detected after the previous one, actually EVERY measurement cycle is expected to end with n consecutive measurements of 0 no reflections after the once already recorded (or none at all). If the TRj 0 it means that the measurement did not detect any reflection. If TRj is valid (>0) internal parameter TFR is set to TRj+1 uSec (ready to detect reflection 100 m farther away), k is set to 1 and j is incremented, and the measurement loop repeats by continuing from 44 and repeating the cycle. By adding the 1 uSec to the TFR we ensure that the next measurement will start sufficiently after the last measured reflection and thus be a valid new measurement.

The k counter is the counter of failed measurements. After each failed measurement the cycle re-starts (connection 4 between FIG. 6*b* and FIG. 6 *a*) through, STATE 613 where k is incremented. If the three Tn measured were different (the test T1=T2= . . . =Tn had failed) the k counter is checked. If it is smaller than a preset number (e.g. 4) another try, through the loop to connector 4, to the µOTDR Disable cheek and eventually to, STATE 613, will commence. If it reaches the set number it means that there is a problem (for example a regular—non µOTDR—transceiver that transmits intermittently from the other side) and no further measurement can take place.

The j counter is the counter of valid reflections. The present invention can get to the check of j=0? If TRj=0 OR if k exceeds the pre-set value.

If j is 0—no reflection. OR measurement cannot be completed, RESET current reflection data to 0 reflections and the FlgOTDRsuccess is checked. If FlgOTDRsuccess is one it means that at least one successful measurement took place in a prior cycle—and since this measurement had failed something has changed. The FlgOTDRsuccess=1 it means that all n times were 0 and the branch will reset all current data (since we got here when j was 0). If we do not have an FlgOTDRsuccess we set j to 15 and none of the existing data will be re-written—we could not conclude this measurement cycle.

If j is >0 (j=0 test results in No)—at least one reflection measurement cycle was concluded successfully so only data for j+1 and higher will be reset. Next all data is saved in memory 115, and the farthest reflection will be stored in our example at a location (byte 124) page A2. Through connector 5 the state machine will return to, STATE 602 and enter 640.

FIG. 6*c* depicts the DPS (Delta Power Sensor) and its integration with the µOTDR operation. Simple independent loop starting at 659 that resets the value of the LOS<Rx> counter in step 658 to S times 6 (S*6) is our example. We will use S as a scaling factor for various measurements in the following. This initial value represents the number of sampling events that must pass before another monitoring function starts. LOS<Rx> is a counter that counts down every time a new input power measurement. Rx Power is the input power measurement and it is typically implemented in fiber optic transceivers and is not explained here.

Delta Power Measurement (DPS) description: In order to measure changes in the incoming optical power, which may have originated due to fiber handling, disconnect, etc., an algorithm depicted below is used to eliminate measurement noise. STATE 611 is the start of DPS measurement. Other digital filtration and/or smoothing can be used and what is depicted here is for example only. Every cycle of the internal micro-controller 102 the input optical power is measured (designated measure Rx Power) and is present in memory 115. Individual measurements are noise susceptible so a smoothing filter is used. In the example we use smooth parameter S to designate a generic family of smoothing filters. rxPwr that represents a smoothed measurement value, for example:

$$rxPwr = rxPwr + (measuredRx\ Power - rxPwr)/S \quad \text{(Equation 3)}$$

Other smoothing filters are well known to a person knowledgeable in the art of digital signal processing. After each measurement cycle all the previous values are retained internally in sequence. Up to 3*S values of smoothed input power are kept in memory 102. The latest value of the smoothed power rxPwr is rxPwr(0) and the "oldest" in our example is in a generalized form rxPwr(3*S−1). The LOS<Rx>counter is checked to see if the minimum number of measurements (6*S) in our example was completed. If not the LOS<Rx>counter is decremented and loop returns to 650. After the minimum measurements were accumulated the LOS<Rx>counter is set to 0, and it will remain 0 until LOS or LOSout High will be detected in 659. Once the amount of measurements are sufficient the rxPwr(0)—latest smoothed value is compared with rxPwr(m), m is the oldest measurement (3*S−1 measurements ago) to check if the difference is bigger that a set threshold at decision point 652.

The formula depicted is:

$$ABS(rxPwr[m]-rxPwr[0])>MIN(rxPwr[m],rxPwr[0])/Q$$

and $$ABS(rxPwr[m]-rxPwr[0])>Q+2 \quad \text{(Equation 4)}$$

Equation 4 depicted above (52 in FIG. 6b) uses Q variable to scale in reference to the smallest power of the two, rxPwr (0) and rxPwr(m). The condition of the absolute value of the change must be bigger than Q by 2 in this example to avoid noisy measurements for very low power values. The variable Q effectively sets the relative power change. Table 2 can be used to decide how much delta one wants to detect. A typical operating example can be S=8 and Q=16.

If the difference is bigger than the set threshold—the decision point 652 will result in Yes and further test—is μOTDR measurement after DPS is enabled (for example by bit 5 byte 123) if it is not enabled OR the TsC timer is smaller then set time between the last measurement (2 sec in this example) the TRANSCEIVER to, STATE 602 box 639 (through connector 1 between FIG. 6c and FIG. 6a)—monitoring the input power and causing the restart of the input signal evaluation. If the μOTDR measurement after DPS is enabled AND TsC is bigger than the set time, the TsC clock is reset and the STATE MACHINE proceeds to, STATE 612 (through CONNECTOR 2 between FIG. 6c and FIG. 6a) and the actual μOTDR measurement cycle will commence. Enabling μOTDR measurement after DPS ensure that at least an attempt to measure reflection will be conducted. When the 2 TRANSCEIVERS at the two ends of the LINK are configured like that each can go through the same process. If only one detects the DPS and is attempting μOTDR measurement the Tx disable at STATE 612 will cause the other end to have LOS high which restart that transceiver at STATE 602 BOX 639 for its μOTDR operation to commence.

What is claimed is:

1. A fiber optic transceiver and fault detection system having at least one data stream comprising:
   a. at least one optical fiber having a first end and a second end;
   b. at least one optical transmitter including a laser diode and a high speed laser diode driver coupled to the first end of said optical fiber;
   c. at least one optical receiver coupled to the second end of said optical fiber;
   d. a data stream;
   e. a means to separate an outgoing stream of data from an incoming stream of data;
   f. a means to transport the data stream bi-directionally over a single optical fiber;
   g. a means to transmit data includes impedance matching between the laser diode and the laser diode driver;
   h. a generator means to transmit a high power pulse to the laser diode including impedance matching between the laser diode and a high power pulse generator means;
   i. the means to transmit the high power pulse to the laser diode is decoupled from the means to transmit data;
   j. a means to receive an echo of the high power pulse includes a differential amplifier and a differential noise filter;
   k. a means to measure the time between sending the high power pulse and the time to receive the echo of the high power pulse; and
   l. at least one optical element, said at least one optical element used for both data transmission and optical time domain measurements of a reflection in the optical fiber;
   m. whereby the existence and the location of a fault in an optical fiber is detected.

2. The fiber optic transceiver and fault detection system of claim 1, further comprising the at least one optical element used for both data transmission and optical time domain measurements of a reflection in the optical fiber, said optical element measures multiple reflections within the optical fiber and reports said multiple reflection to a host equipment.

3. The fiber optic transceiver and fault detection system of claim 1, further comprising a means to store and a means to report multiple reflections to a host equipment.

4. The fiber optic transceiver and fault detection system of claim 3, further comprising the user indexes one reflection at a time.

5. The fiber optic transceiver and fault detection system of claim 1, further comprising a means to detect incoming foreign optical signals during the measurement of the optical time domain measurements of a reflection in the optical fiber.

6. The fiber optic transceiver and fault detection system of claim 1, further comprising a means to eliminate false measurement data.

7. The fiber optic transceiver and fault detection system of claim 1, further comprising the at least one optical transmitter has a power of at least 10 dBm.

8. The fiber optic transceiver and fault detection system of claim 1, further comprising the at least one optical receiver has a sensitivity of less than −40 dBm.

9. The fiber optic transceiver and fault detection system of claim 1, further comprising the fiber optic transceiver has a dynamic range of more than 55 dB.

10. The fiber optic transceiver and fault detection system of claim 1, further comprising optical return loss measurement for each reflection.

11. The fiber optic transceiver and fault detection system of claim 1, further comprising an external control enables and disables the fault detection measurement.

12. The fiber optic transceiver and fault detection system of claim 1, further comprising the fiber cable is integrated with a physical structure, wherein a break in the optical fiber is the location of a break in the physical structure, said physical structure is chosen from the group consisting of wires, cables, chains, tubes, conduits, pipelines, fences, tunnels, tracks and passageways.

13. The fiber optic transceiver and fault detection system of claim 1, further comprising at least one set of host equipment with which the fiber optic transceiver is in communication.

14. The fiber optic transceiver and fault detection system of claim 1, further comprising there is only a single optical fiber.

15. The optic fiber transceiver and fault detection system of claim 1, further comprising: the echo differential pulse shaper is between a receiver transimpedance amplifier and the differential amplifier.

16. A single fiber transceiver, utilizing bi-directional single wavelength for communication over optical fiber with reflection immunity comprising:
   a. at least one optical fiber having a first end and a second end;
   b. at least one optical transmitter coupled to the first end of the at least one optical fiber;
   c. said at least one optical transmitter includes means to disable the transmitted optical power;

d. at least one optical receiver coupled to the second end of the at least one optical fiber;
e. at least one set of host equipment;
f. a data stream;
g. a means to separate an outgoing stream of data from an incoming stream of data;
h. a means to transport the data stream bi-directionally over one optical fiber using a single wavelength; and
i. a means to distinguish between an optical power of a transmitter coupled to a first end of an optical fiber reflected back and an incoming optical data stream from an optical transmitter coupled to a second end of an optical fiber, the means including a controlled disabling of at least one optical transmitter.

17. The single fiber transceiver, utilizing bi-directional single wavelength for communication over optical fiber with reflection immunity of claim 16, further comprising a means to detect incoming power change during a data link operation.

18. A single fiber transceiver, utilizing bi-directional single wavelength for communication over optical fiber with reflection immunity of claim 17, further comprising a means to change a threshold of the incoming power change detection.

19. A single fiber transceiver, utilizing bi-directional single wavelength for communication over optical fiber with reflection immunity of claim 16 further comprising a means to filter incoming power measurements.

20. A single fiber transceiver, utilizing bi-directional single wavelength communication over optical fiber with reflection immunity of claim 16, further comprising a means to block self-reflected data from reaching the at least one set of host equipment.

21. A single fiber transceiver, utilizing bi-directional single wavelength for communication over optical fiber with reflection immunity of claim 16, further comprising a data transceiver, said data transceiver having optical time domain reflectometry functions.

22. A single fiber transceiver, utilizing bi-directional single wavelength for communication over optical fiber with reflection immunity of claim 17, further comprising a means to control the data link operation conditions that initiate an optical time measurements.

23. A single fiber transceiver and fault detection system, utilizing bi-directional single wavelength for communication over optical fiber having at least one data stream, the apparatus comprising:
a. at least one optical fiber having a first end and a second end;
b. at least one optical transmitter coupled to the first end of said optical fiber;
c. at least one optical receiver coupled to the second end of said optical fiber;
d. a data stream;
e. a means to separate an outgoing stream of data from an incoming stream of data;
f. a means to transport the data stream bi-directionally over a single optical fiber;
g. a means to transmit a high power pulse, the means to transmit the high power pulse is decoupled from a means to transmit data;
i. a means to receive an echo of the high power pulse includes a differential amplifier and a differential noise filter;
j. a means to measure the time between sending the high power pulse and the time to receive the echo of the high power pulse;
k. at least one optical element, said at least one optical element used for both data transmission and optical time domain measurements of a reflection in the optical fiber; and
l. a means to distinguish between an optical power of said at least one optical transmitter reflected back and an incoming optical data stream from a remote transceiver;
m. whereby the existence and the location of a fault in an optical fiber is detected.

24. A single fiber transceiver and fault detection system, utilizing bi-directional single wavelength for communication over optical fiber with reflection immunity, having at least one data stream of claim 23, further comprising an external control to toggle between link priority and sense priority.

25. A single fiber transceiver and fault detection system, utilizing bi-directional single wavelength for communication over optical fiber with reflection immunity, having at least one data stream of claim 23, further comprising an external initiation of a reflection measurement cycle.

26. The fiber optic transceiver and fault detection system of claim 23, further comprising at least one set of host equipment with which the transceiver is in communication.

27. A method of monitoring a fiber optic network with at least one transceiver having a micro optical time domain reflectometry function that is attached to at least one fiber connected at one end of the fiber optic network, the method comprising:
a. connecting a transceiver into host equipment, said transceiver having micro optical time domain reflectometry function, and said host equipment is capable of reading information from the transceiver;
b. transmitting and receiving data;
c. utilizing an echo detection with a dynamic range of at least 50 db to enable detection of a fault generated by a break in at least one fiber in the fiber optic network;
d. gathering data utilizing the micro optical time domain reflectometry readings;
e. storing fault data into the transceiver;
f. reading said stored data from the transceiver; and
g. reporting by the host equipment of the fault data.

28. The method of monitoring a fiber optic network of claim 27, further comprising the steps of:
a. detecting a fault generated by a break in at least one fiber at any location in the fiber optic network, integrating the break location with an external mapping source; and
b. displaying where the fault location is on the map.

29. The method of monitoring a fiber optic network of claim 27, further comprising the step of issuing messages automatically to multiple locations.

30. The method of monitoring a fiber optic network of claim 27, further comprising the step of integrating the fiber cable with a physical structure, wherein a break in the optical fiber is the location of a break in the physical structure.

31. The physical structure of claim 30, wherein the physical structure is chosen from the group consisting of wires, cables, chains, tubes, conduits, pipelines, fences, tunnels, tracks and passageways.

* * * * *